US006961137B1

(12) United States Patent
Tamura

(10) Patent No.: US 6,961,137 B1
(45) Date of Patent: Nov. 1, 2005

(54) NETWORK FACSIMILE COMMUNICATION CONTROL METHOD

(75) Inventor: Hiroshi Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/572,421

(22) Filed: May 16, 2000

(30) Foreign Application Priority Data

May 20, 1999 (JP) .................................. 11-139523

(51) Int. Cl.[7] .......................... G06F 13/00; H04N 1/00
(52) U.S. Cl. ..................................... 358/1.15; 358/402
(58) Field of Search ............................... 358/1.15, 402, 358/442, 434, 435, 440; 379/100.06, 100.01, 379/88.17, 265.09; 370/522; 709/206, 249

(56) References Cited

U.S. PATENT DOCUMENTS

| 5,907,598 A * | 5/1999 | Mandalia et al. ...... 379/100.01 |
| 6,023,345 A * | 2/2000 | Bloomfield .................. 358/402 |
| 6,028,917 A * | 2/2000 | Creamer et al. ....... 379/100.01 |
| 6,058,169 A * | 5/2000 | Bramnick et al. ..... 379/100.01 |
| 6,208,426 B1 * | 3/2001 | Saito et al. ................ 358/1.15 |
| 6,230,189 B1 * | 5/2001 | Sato et al. .................. 709/206 |
| 6,324,187 B1 * | 11/2001 | Watanabe et al. ........... 370/522 |
| 6,381,320 B1 * | 4/2002 | Creamer et al. ....... 379/201.01 |
| 6,396,848 B1 * | 5/2002 | Ohta .......................... 370/490 |
| 6,437,873 B1 * | 8/2002 | Maeda ...................... 358/1.15 |
| 6,477,243 B1 * | 11/2002 | Choksi et al. ......... 379/100.06 |
| 6,498,797 B1 * | 12/2002 | Anerousis et al. .......... 370/522 |
| 6,560,329 B1 * | 5/2003 | Draginich et al. ..... 379/265.02 |
| 6,603,569 B1 * | 8/2003 | Johnson et al. ............ 358/1.15 |
| 6,618,165 B1 * | 9/2003 | Sehgal ...................... 358/1.15 |
| 6,671,063 B1 * | 12/2003 | Iida ........................... 358/1.15 |
| 6,785,266 B2 * | 8/2004 | Swartz ....................... 370/352 |
| 2001/0000441 A1 * | 4/2001 | Zinkov et al. |
| 2001/0014910 A1 * | 8/2001 | Bobo, II ..................... 709/206 |
| 2002/0018236 A1 * | 2/2002 | Musk et al. |
| 2002/0131071 A1 * | 9/2002 | Parry |
| 2003/0035141 A1 * | 2/2003 | Ilda ........................... 358/1.15 |
| 2003/0107776 A1 * | 6/2003 | Maeda |
| 2003/0169449 A1 * | 9/2003 | Idia |

FOREIGN PATENT DOCUMENTS

JP          2000270137 A  *  9/2000    ............ H04N 1/00

* cited by examiner

Primary Examiner—Madeleine Nguyen
(74) Attorney, Agent, or Firm—Cooper & Dunham LLP

(57) ABSTRACT

In a network facsimile communication system including Internet fax devices and a server, the Internet fax devices have both a capability of exchanging fax images over a public switched telephone network PSTN and a capability of exchanging messages over the Internet. The server has a file transfer capability and is provided on the Internet. A called Internet fax device sends, upon incoming of a call from the PSTN, an Internet fax indication to a calling Internet fax device, the indication indicating that the called device has an Internet fax capability. The calling Internet fax device sends, after the Internet fax indication is received, an universal resource locator URL, indicating a location of the server on the Internet as a destination of a fax image, to the called Internet fax device, releases the call from the PSTN, and transmits the fax image to the server corresponding to the URL. The called Internet fax device accesses the server on the Internet by using the received URL, so that the called Internet fax device receives the fax image from the server.

18 Claims, 17 Drawing Sheets

NETWORK FACSIMILE COMMUNICATION CONTROL METHOD

BACKGROUND OF THE INVENTION

1. Field of the Invention

The present invention relates to a network facsimile communication control method which controls a network facsimile communication system including Internet fax devices and a server, the Internet fax devices having both a capability of exchanging fax images over a public switched telephone network and a capability of exchanging messages over the Internet, the server having a file transfer capability and being provided on the Internet.

2. Description of the Related Art

Recently, a network facsimile communication system using Internet fax devices is becoming practical. The Internet fax devices have both a capability of exchanging fax images over the public switched telephone network (PSTN) and a capability of exchanging messages over the Internet.

ITU-T recommendations T.37 and T.38 are provided for the standards of store-and-forward fax via an electronic mail (e-mail). ITU-T recommendation T.37 defines store-and-forward fax via e-mail through the incorporation of specified communication protocol. Fax image documents are attached to e-mail headers and are encoded in the specified data format. ITU-T recommendation T.38 addresses IP fax transmissions for IP-enabled fax devices and fax gateways, defining the translation of T.30 fax signals and Internet fax protocol packets.

With the above-mentioned ITU-T recommendations, the Internet fax devices which are provided with both the capability of exchanging fax images over the PSTN and the capability of exchanging messages over the Internet are put into practical use.

In addition, there have been some approaches for exchanging fax images over the Internet by using e-mail, which are described in the RFC (request for comments) 2301 through 2306 published by the IETF (Internet Engineering Task Force).

The e-mail transmission protocols are shared by the T.37 and the RFC 2305 (simple mode fax). This makes it possible to exchange fax images via e-mail between the Internet fax devices which conform to the T.37 and the workstations or network facsimile devices which incorporate application programs conforming to the RFC 2305.

However, there is a case in which a call to the PTSN is initiated by one Internet fax device of the network facsimile communication system, and the called number, keyed in the calling Internet fax device, indicates a fax number of another Internet fax device on the PSTN. In the existing facsimile communication system, the call setup is established with respect to the PSTN in this case, and the fax transmission and reception is performed between the calling and called Internet fax devices via the PSTN. Although the Internet fax devices have the capability of exchanging messages over the Internet, the PSTN-based fax transmission and reception is performed in this case. In view of the transmission speed and transmission capacity, it is conceivable that the cost of the PSTN-based communications is higher than the cost of the Internet-based communications. Accordingly, in order to reduce the cost of communications of the Internet fax devices, it is desired to provide a communication control method that carries out the fax communications of the Internet fax devices over the Internet, rather than over the PSTN, when a call to the PSTN is initiated by one of the Internet fax devices.

SUMMARY OF THE INVENTION

In order to overcome the above-described problems, preferred embodiments of the present invention provide an improved network facsimile communication control method that effectively performs fax transmissions and receptions to exchange a fax image between Internet fax devices via the Internet, rather than via the PSTN, when a call to the PSTN is initiated by one of the Internet fax devices.

According to one preferred embodiment of the present invention, a method of controlling a network facsimile communication system including Internet fax devices and a server, the Internet fax devices having both a capability of exchanging fax images over a public switched telephone network PSTN and a capability of exchanging messages over the Internet, the server having a file transfer capability and provided on the Internet, includes the steps of: causing a called Internet fax device to send, upon incoming of a call from the PSTN, an Internet fax indication to a calling Internet fax device, the indication indicating that the called device has an Internet fax capability; causing the calling Internet fax device to send, after the Internet fax indication is received, an universal resource locator URL, indicating a location of the server on the Internet as a destination of a fax image, to the called Internet fax device, to release the call from the PSTN, and to transmit the fax image to the server corresponding to the URL; and causing the called Internet fax device to access the server on the Internet by using the received URL, so that the called Internet fax device receives the fax image from the server.

According to another preferred embodiment of the present invention, a method of controlling a network facsimile communication system including Internet fax devices and a server, the Internet fax devices having both a capability of exchanging fax images over a public switched telephone network PSTN and a capability of exchanging messages over the Internet, the server having a file transfer capability and provided on the Internet, includes the steps of: causing a called Internet fax device to send, upon incoming of a call from the PSTN, an Internet fax indication to a calling Internet fax device, the indication indicating that the called Internet fax device has an Internet fax capability; causing the calling Internet fax device to send, after the Internet fax indication is received, an universal resource locator URL, indicating a location of the server on the Internet as a destination of a fax image, and a destination mail address, indicating a location of a destination of a delivery-confirmation message, to the called Internet fax device, to release the call from the PSTN, and to transmit the fax image to the server corresponding to the URL; and causing the called Internet fax device to access the server by using the received URL so that the called Internet fax device receives the fax image from the server, and to send, after the fax image is received, the delivery-confirmation message to the destination with the location indicated by the received destination mail address.

The network facsimile communication control method of the present invention is effective in reducing the cost of fax communications of the Internet fax devices since the fax transmissions and receptions are automatically performed between the Internet fax devices via the Internet, rather than via the PSTN, when a call to the PSTN is initiated by one of the Internet fax devices.

BRIEF DESCRIPTION OF THE DRAWINGS

Other objects, features and advantages of the present invention will become apparent from the following detailed description when read in conjunction with the accompanying drawings in which.

DETAILED DESCRIPTION OF PREFERRED EMBODIMENTS

A description will now be provided of preferred embodiments of the present invention with reference to the accompanying drawings.

Figure 1:
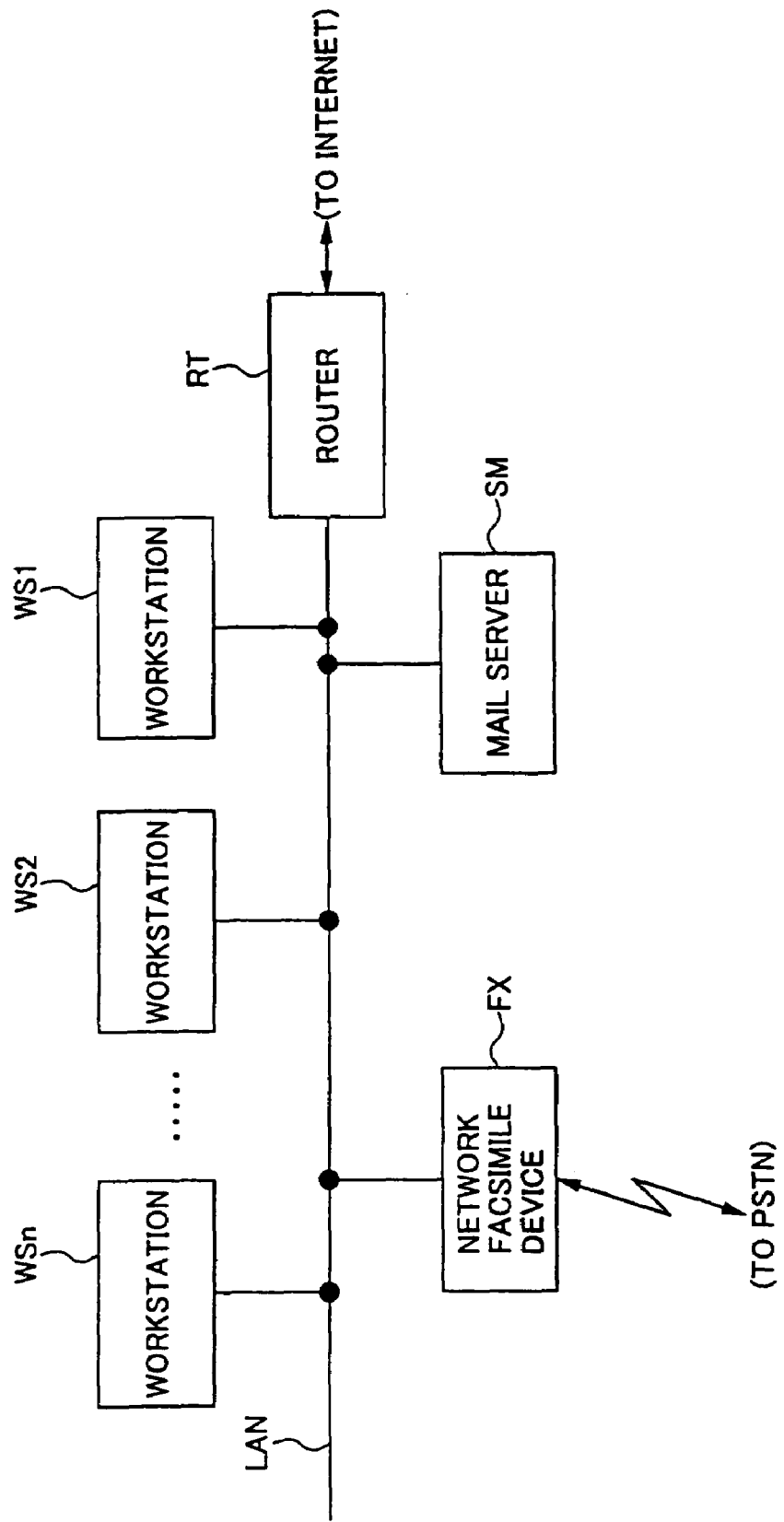
FIG. 1 is a block diagram of a network facsimile communication system.

FIG. 1 is a block diagram of a network facsimile communication system to which one preferred embodiment of the communication control method of the invention is applied.

As shown in FIG. 1, the network facsimile communication system constitutes a local area network (LAN) to which a number of workstations "WS1", "WS2", . . . , "WSn", a mail server "SM", a network facsimile device "FX", and a router "RT" are linked. The router "RT" connects the LAN to the Internet. The LAN is connected to the Internet via the router RT, so that the workstations "WS1" through "WSn", the mail server "SM" and the network facsimile device "FX" can exchange data with any host computer or any workstation on another LAN which is connected to the Internet.

In the network facsimile communication system of FIG. 1, the mail server "SM" provides electronic mail (e-mail) collection and distribution services for the workstations "WS1" through "WSN" and the network facsimile device "FX" on the LAN. The mail server "SM" in the present embodiment is provided with an FTP file-transfer server capability, an HTTP file-transfer server capability, an FTP file reception and distribution capability, and an HTTP file reception and distribution capability.

In the network facsimile communication system of FIG. 1, the workstations "WS1" through "WSn" are provided with e-mail transmission and reception application programs which enable the users on the workstations to exchange messages over the Internet through the LAN. The workstations "WS1" through "WSn" are provided with facsimile data processing application programs, which deal with facsimile data received at the network facsimile device "FX". The workstations "WS1" through "WSn" are used by one or a plurality of specific users on the local area network (LAN).

Further, in the network facsimile communication system of FIG. 1, the network facsimile device "FX" is connected to a public switched telephone network (PSTN). The network facsimile device "FX" is provided with an e-mail transmission and reception capability to exchange messages over the Internet, and with a fax transmission and reception capability to exchange fax images over the PSTN. Further, the network facsimile device "FX" in the present embodiment is provided with a point-to-point transmission processing capability to exchange data with the workstations "WS1" through "WSn" on the LAN, an FTP file-transfer client function to exchange data with the mail server "SM", an HTTP file-transfer client function to exchange data with the mail server "SM", and a group-3 facsimile transmission and reception capability to exchange fax images over the PSTN. Hereinafter, the network facsimile device "FX" in the present embodiment is also called the Internet fax device.

Figure 2:
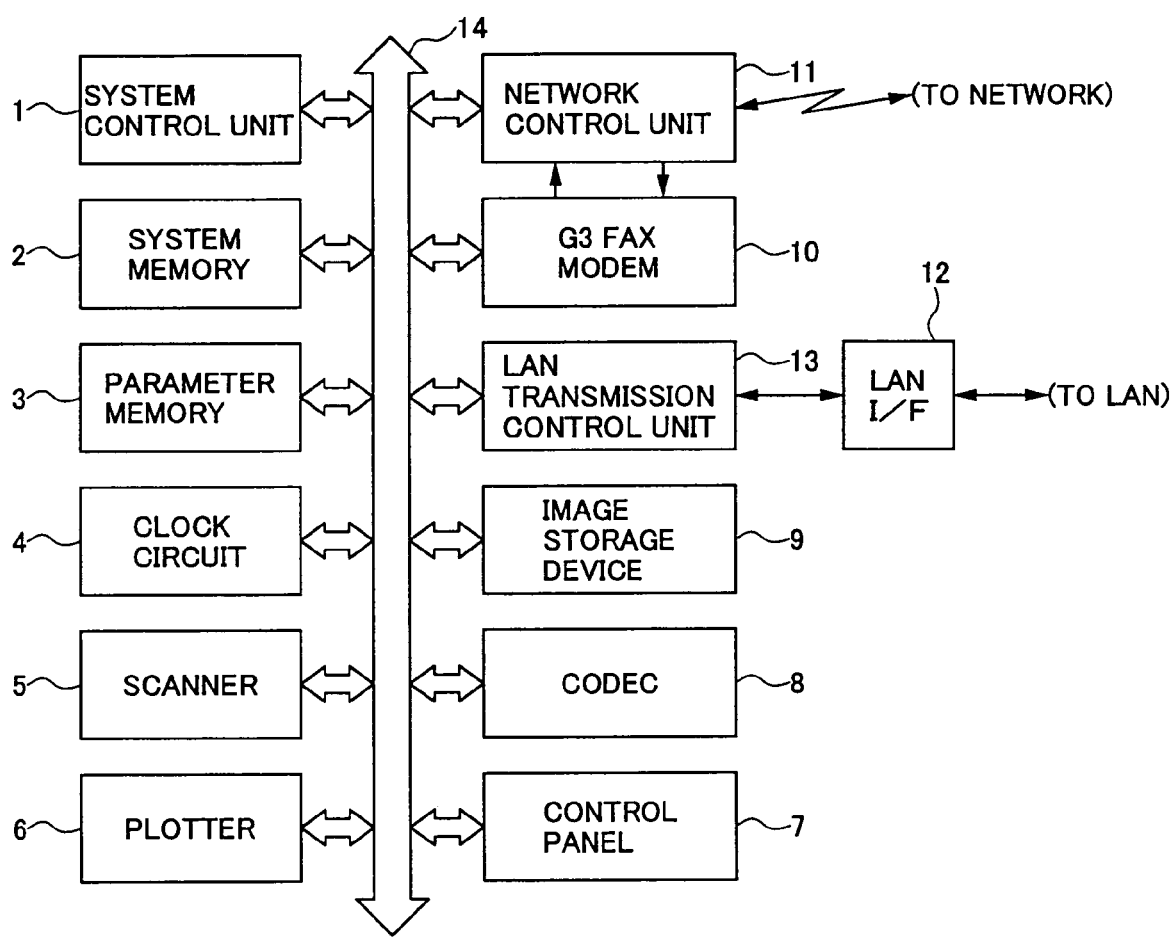
FIG. 2 is a block diagram of a network facsimile device in the network facsimile communication system to which one preferred embodiment of the communication control method of the invention is applied.

FIG. 2 is a block diagram of the network facsimile device "FX" in the network facsimile communication system of FIG. 1.

As shown in FIG. 2, the network facsimile device "FX" generally comprises a system control unit 1, a system memory 2, a parameter memory 3, a clock circuit 4, a scanner 5, a plotter 6, a control panel 7, a codec (coder/decoder) 8, an image storage device 9, a G3 (group-3) fax modem 10, a network control unit 11, and an LAN transmission control unit 13. These elements of the network facsimile device "FX" are interconnected by an internal bus 14. The exchange of data between the elements of the network facsimile device "FX" is primarily carried out by using the internal bus 14. The network control unit 11 connects the network facsimile device "FX" to the PSTN (public switched telephone network). The LAN transmission control unit 13 is connected to the LAN (shown in FIG. 1) via an LAN interface ("I/F") unit 12.

In the network facsimile device of FIG. 2, the system control unit 1 controls the elements 2 through 14 of the network facsimile device "FX", and carries out various facsimile transmission control processes. The system memory 2 stores various control programs and control data, which are used by the system control unit 1 when performing the facsimile transmission, control processes. The system memory 2 also provides working areas for the system control unit 1 when performing the facsimile transmission control processes. The parameter memory 3 stores various operational parameters, which are specific to the network facsimile device "FX". The clock circuit 4 provides current-time information for the system control unit 1 during operation.

In the network facsimile device of FIG. 2, the scanner 5 is provided to capture a document image at a given resolution by optically scanning the document prior to a fax image transmission. The plotter 6 is provided to print out a document image at a given resolution following a fax image reception. The control panel 7 is provided with various operational keys, indicators and displays. The operational keys of the control panel 7 are operated by the user to control the operation of the network facsimile device "FX".

Further, in the network facsimile device of FIG. 2, the codec 8 is provided to encode and compress the captured document image before the fax transmission, as well to decode and decompress the fax image after the fax reception. The image storage device 9 is provided to store a plurality of encoded image data items. The image storage device 9 serves to provide a store-and-forward facsimile function. The G3 fax modem 10 provides the network facsimile device "FX" with the group-3 facsimile transmission and reception capability to exchange fax images over the PSTN. The G3 fax modem 10 supports a low-speed modem capability (V.21 modem) to exchange protocol signals, and a high-speed modem capability (V.17 modem, V.34 modem, V.29 modem, V.27ter modem, etc.) to exchange image data.

Further, in the network facsimile device of FIG. 2, the network control unit 11 is provided to connect the network facsimile device "FX" to the PSTN. The network control unit 11 incorporates an automatic call transmitting/receiving function. The LAN interface unit 12 is provided to connect the network facsimile device "FX" with the LAN shown in FIG. 1. The LAN transmission control unit 13 provides the network facsimile device "FX" with the transmission processing capability to exchange data with the workstations "WS1" through "WSn" on the LAN, with the FTP file-transfer client function to exchange data with the mail server "SM", and with the HTTP file-transfer client function to exchange data with the mail server "SM". The network control unit 11 and the G3 fax modem 10 directly exchange data between these elements.

The network facsimile device "FX" in the above-described embodiment provides the capability of fax transmissions and receptions via electronic mails using the mail server "SM", by incorporating the SMTP (simple mail transfer protocol) and the MIME (multipurpose Internet mail extension). The SMTP is an application-layer extension of TCP/IP (transmission control protocol/Internet protocol), which governs e-mail transmissions and receptions. The MIME is an SMTP extension which supports compound mail. In this context, the MIME provides for the attachment of a compressed fax image to an e-mail.

Specifically, in the network facsimile device "FX" of the present embodiment, fax image documents are attached to e-mail headers and are encoded in the TIFF-F (tagged image file format-fax) compressed data format. Further, the network facsimile device "FX" of the present embodiment may include a mechanism for ensuring call completion through negotiation of capabilities between the transmitting and receiving fax devices. The network facsimile device "FX" of the present embodiment may provide for delivery confirmation.

In the workstations "WS1" through "WSn" on the LAN of FIG. 1, the POP (post office protocol) is incorporated to confirm a reception of an e-mail (addressed to a specific user) at the mail server "SM" and to confirm a request for transmission of an e-mail (addressed to a specific user) to the mail server "SM".

The TCP/IP, SMTP, POP, FTP and HTTP are descried in the RFC (request for comments) documents published by the IETF (Internet Engineering Task Force). For example, the TCP/IP is described in the RFC 793, the SMTP is described in the RFC 821, the electronic mail format such as the MIME is described in the RFC 822, the RFC 1521 and the RFC 1522, the FTP is described in the RFC 354, the HTTP is described in the RFC 2068, and the protocol for fax transmissions and receptions via electronic mails is described in the RFC 2305.

Figure 3:
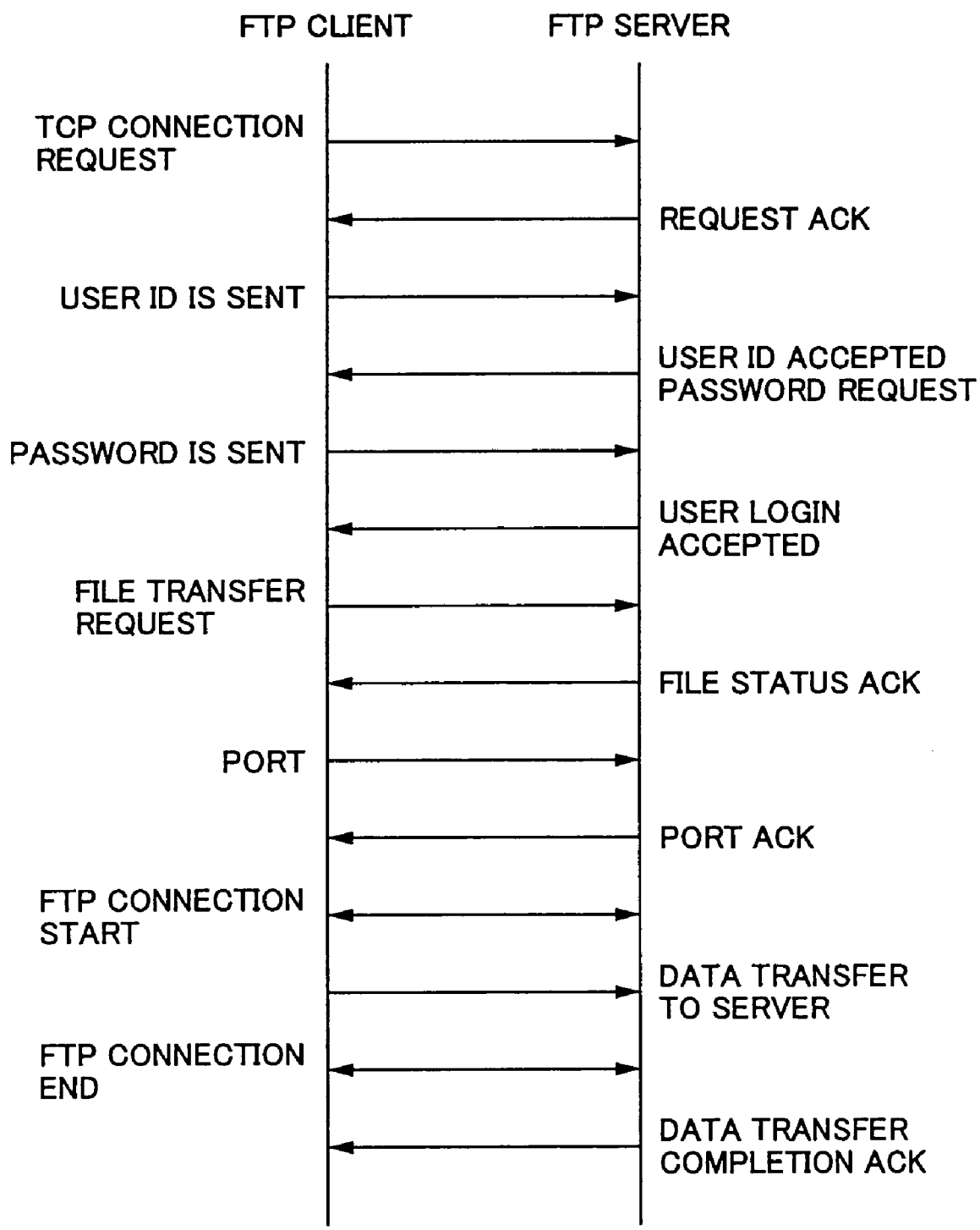
FIG. 3 is a sequence diagram for explaining a sequence of communication control steps to transmit a fax image from a calling FTP client to an FTP server so that the fax image is stored in the FTP server.

FIG. 3 is a sequence diagram for explaining a sequence of communication control steps to transmit a fax image from a sender FTP client to an FTP server so that the fax image is stored in the FTP server. In the sequence diagram of FIG. 3, the FTP client is, for example, the network facsimile device "FX", and the FTP server is, for example, the mail server "SM".

As shown in FIG. 3, the FTP client sends a TCP connection request to the FTP server. In response to this request, the FTP server sends a request acknowledgement to the FTP client.

The FTP client sends a user identifier (ID) to the FTP server. When the user ID is accepted at the FTP server, the FTP server sends a password input request to the FTP client.

The FTP client sends a password to the FTP server. The FTP server carries out a user authentication process with the received password. When the password is accepted at the FTP server, the FTP server sends a message indicating the acceptance of the user login, to the FTP client.

When the user login is accepted, the FTP client sends a file transfer request (or a fax image storage command) to the FTP server. When the file transfer request is accepted at the FTP server, the FTP server sends a file status acknowledgement to the FTP client.

The FTP client sends a port command to the FTP server. In response to this port command, the FTP server sends a port acknowledgement to the FTP client.

When the above preparatory processes are successfully completed, an FTP connection between the FTP client and the FTP server is established. The FTP client transmits a fax image to the FTP server through the FTP connection, so that the fax image is stored in the FTP server.

After the data transmission from the FTP client to the FTP server is completed, the FTP connection between the FTP client and the FTP server is terminated, and the FTP client is disconnected from the FTP server. Finally, the FTP server sends a data transfer completion acknowledgement to the FTP client.

Figure 4:
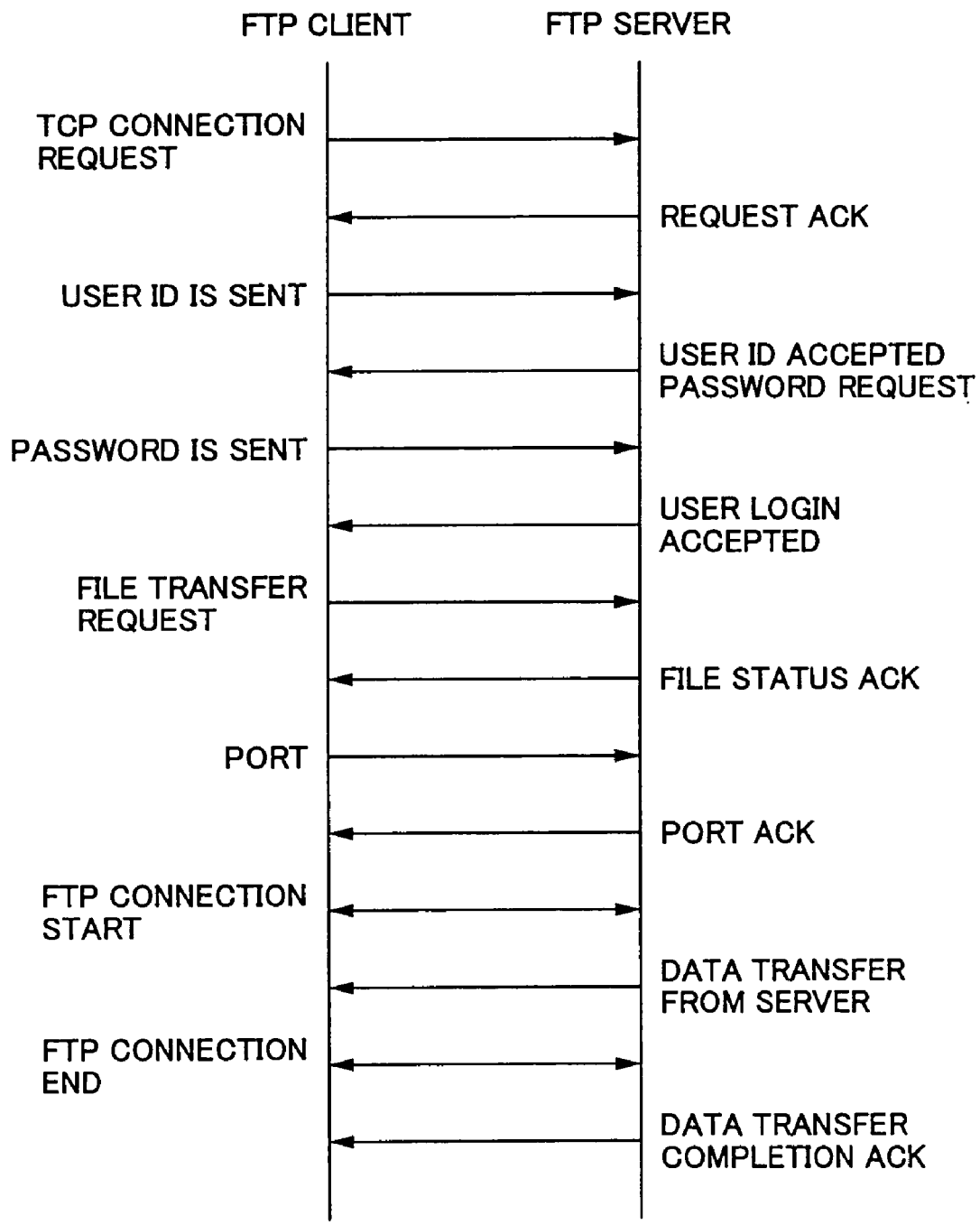
FIG. 4 is a sequence diagram for explaining a sequence of communication control steps to receive a fax image from an FTP server at a receiver FTP client.

Next, FIG. 4 is a sequence diagram for explaining a sequence of communication control steps to receive a fax image from an FTP server at a receiver FTP client. In the sequence diagram of FIG. 4, the FTP client is, for example, another network facsimile device "FX" on another LAN linked to the Internet, and the FTP server is, for example, the mail server "SM".

As shown in FIG. 4, the FTP client sends a TCP connection request to the FTP server. In response to this request, the FTP server sends a request acknowledgement to the FTP client.

The FTP client sends a user identifier (ID) to the FTP server. When the user ID is accepted at the FTP server, the FTP server sends a password input request to the FTP client.

The FTP client sends a password to the FTP server. The FTP server carries out a user authentication process with the received password. When the password is accepted at the FTP server, the FTP server sends a message indicating the acceptance of the user login, to the FTP client.

When the user login is accepted, the FTP client sends a file transfer request (or a fax image receiving command) to the FTP server. When the file transfer request is accepted at the FTP server, the FTP server sends a file status acknowledgement to the FTP client.

The FTP client sends a port command to the FTP server. In response to this port command, the FTP server sends a port acknowledgement to the FTP client.

When the above preparatory processes are successfully completed, an FTP connection between the FTP client and the FTP server is established. The FTP server transmits a stored fax image (specified by the fax image receiving command) to the FTP client through the FTP connection, so that the fax image is received at the FTP client.

After the data transmission from the FTP server to the FTP client is completed, the FTP connection between the FTP client and the FTP server is terminated, and the FTP client is disconnected from the FTP server. Finally, the FTP server sends a data transfer completion acknowledgement to the FTP client.

Figure 5:
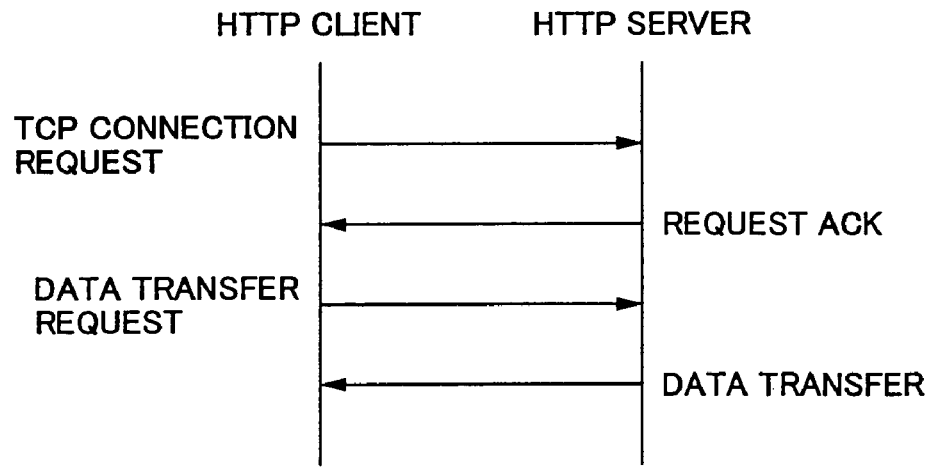
FIG. 5 is a sequence diagram for explaining a sequence of communication control steps to receive a fax image from an HTTP server at a receiver HTTP client.

Next, FIG. 5 is a sequence diagram for explaining a sequence of communication control steps to receive a fax image from an HTTP server at a receiver HTTP client. In the sequence diagram of FIG. 5, the HTTP client is, for example, another network facsimile device "FX" on another LAN linked to the Internet, and the HTTP server is, for example, the mail server "SM". Suppose that a specified fax image, transmitted to the HTTP server by an FTP client, is already stored in the HTTP server.

As shown in FIG. 5, the HTTP client sends a TCP connection request to the HTTP server. In response to this request, the HTTP server sends a request acknowledgement to the HTTP client.

A path name of a URL (universal resource locator) indicating a location of the fax image file is described in a data transfer request (or a fax image receiving command) that is sent by the HTTP client. The HTTP client sends the data transfer request to the HTTP server. The HTTP server transmits the stored fax image (specified by the fax image receiving command) to the HTTP client, so that the fax image is received at the HTTP client.

Figure 6:
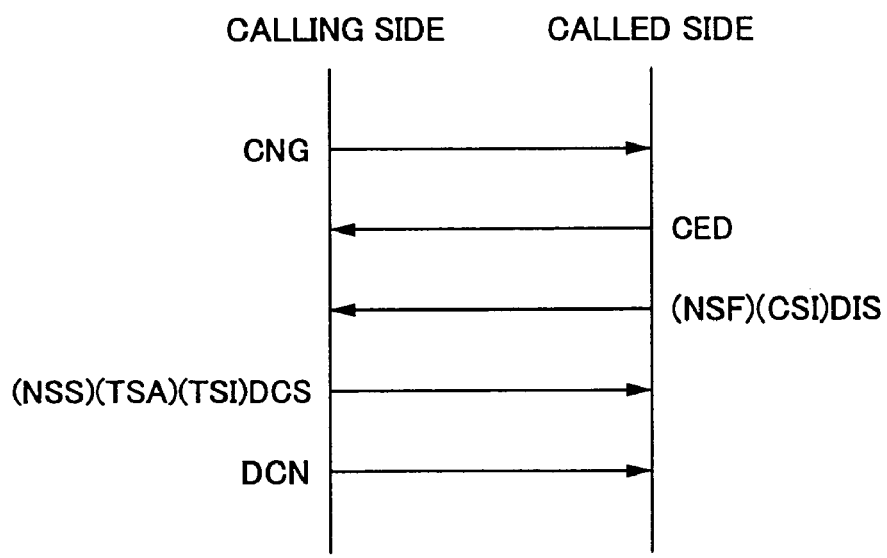
FIG. 6 is a diagram for explaining communication control steps of one preferred embodiment of the communication control method of the invention prior to a start of fax transmission.

FIG. 6 shows communication control steps of one preferred embodiment of the communication control method of the invention prior to a start of fax transmission.

Suppose that a call to the PTSN is initiated by a calling Internet fax device, and the called number, keyed in the calling & Internet fax device, indicates a fax number of another Internet fax device on the PSTN.

The call from the calling Internet fax device is sent from the PSTN to the called Internet fax device. In response to this, a call acknowledgement is sent from the called Internet fax device to the calling Internet fax device. At this instant, as shown in FIG. 6, the calling Internet fax device sends a CNG signal to the called Internet fax device. In response to the CNG signal, the called Internet fax device sends a CED signal to the calling Internet fax device.

After the CED signal is transmitted, the called Internet fax device sequentially sends an NSF signal, a CSI signal, and a DIS signal to the calling Internet fax device. The NSF signal indicates non-standard facilities of the called Internet fax device, and this information is provided to the calling Internet fax device with the NSF signal. The CSI signal indicates a called subscriber identification of the called Internet fax device, and this information is provided to the calling Internet fax device with the CSI signal. The DIS signal indicates standard facilities of the called Internet fax device, and this information is provided to the calling Internet fax device with the DIS signal.

The NSF signal, the CSI signal, and the DIS signal are configured to conform to ITU-T recommendation T.30.

In the present embodiment, the called Internet fax device sends, at this instant, an Internet fax indication to the calling Internet fax device, the Internet fax indication indicating that the called fax device has an Internet fax capability. For example, the Internet fax indication is carried on the NSF signal, and this NSF signal is sent from the called Internet fax device to the calling Internet fax device.

When the NSF signal is received at the calling Internet fax device, the calling Internet fax device determines whether the Internet fax indication is contained in the received NSF signal. In the present example of FIG. 6, the received NSF signal contains the Internet fax indication, and the calling Internet fax device recognizes that the called fax device has the Internet fax capability.

In the example of FIG. 6, after the Internet fax indication is received, the calling Internet fax device determines to perform the fax transmission to the called Internet fax device over the Internet by using the FTP or the HTTP, rather than through the PSTN. The calling Internet fax device sequentially sends an NSS signal, a TSA signal, a TSI signal, and a DCS signal to the called Internet fax device. The NSS signal indicates a non-standard facilities setup of the calling Internet fax device, and this information is provided to the called Internet fax device with the NSS signal. An URL (universal resource locator), which indicates a location of a destination of the sending fax image on the Internet (which is, in the present case, a location of the mail server), is carried on the NSS signal, and the URL is sent to the called Internet fax device with the NSS signal. The TSA signal carries a destination mail address which indicates a location of a destination of a delivery-confirmation message, and the destination mail address is sent to the called Internet fax device with the TSA signal. The TSI signal carries a transmitting subscriber information item of the calling Internet fax device, and this information item is sent to the called Internet fax device with the TSI signal. The DCS signal indicates a standard facilities setup of the calling Internet fax device, and this information is provided to the called Internet fax device with the DCS signal.

The NSS signal, the TSA signal, the TSI signal, and the DCS signal are configured to conform to ITU-T recommendation T.30.

After these signals are sent to the called Internet fax device, the calling Internet fax device sends a DCN signal to the called Internet fax device, so that the call setup process is terminated and the call is released from the PSTN.

When the NSS signal is received at the called Internet fax device, the URL, carried on the NSS signal, is stored in the called Internet fax device. When the TSA signal is received at the called Internet fax device, the destination mail address, carried on the TSA signal, is stored in the called Internet fax device. When the DCN signal is received at the called Internet fax device, the called Internet fax device releases the call from the PSTN and terminates the call setup process.

When a fax image is transmitted from the calling Internet fax device to the called Internet fax device over the Internet by using the FTP, the URL is described in the FTP format, such as "ftp://ftp.sm.co.jp/data/sent.dat". When a fax image is transmitted from the calling Internet fax device to the called Internet fax device over the Internet by using the HTTP, the URL is described in the HTTP format, such as "http://www.sm.co.jp/data/sent.dat".

The destination mail address of the delivery-confirmation message is usually described by a mail address of the calling Internet fax device or a mail address of the administrator of the calling Internet fax device, which is already registered in the network facsimile device "FX". The user on the calling Internet fax device may specify an arbitrary destination mail address each time the fax transmission is performed.

After the URL and the destination mail address are sent to the called Internet fax device, the calling Internet fax device attaches the fax image to the e-mail header and encodes the same in the TIFF-F compressed data format. The calling Internet fax device transmits the fax image to the FTP server corresponding to the URL by using the FTP.

On the other hand, the called Internet fax device accesses the FTP server by using the received URL, so that the called Internet fax device receives the fax image from the server by using the FTP or the HTTP. The plotter 6 of the network facsimile device "FX" prints out the received fax image. After the fax image is received, the called Internet fax device creates the delivery-confirmation message and sends the same to the destination whose location is indicated by the received destination mail address.

As the user or the administrator on the destination workstation or fax device receives the delivery-confirmation message from the called Internet fax device, the delivery of the fax image to the called Internet fax device can be checked by the user or the administrator, which provides increased operability and reliability for the maintenance of fax communications of the Internet fax devices.

In the present embodiment, when the received NSF signal contains no Internet fax indication, the calling Internet fax device recognizes that the called fax device has no Internet fax capability. In this case, the calling Internet fax device determines to perform the PSTN-based fax transmission process which conforms to ITU-T recommendation T.30.

Figure 7:
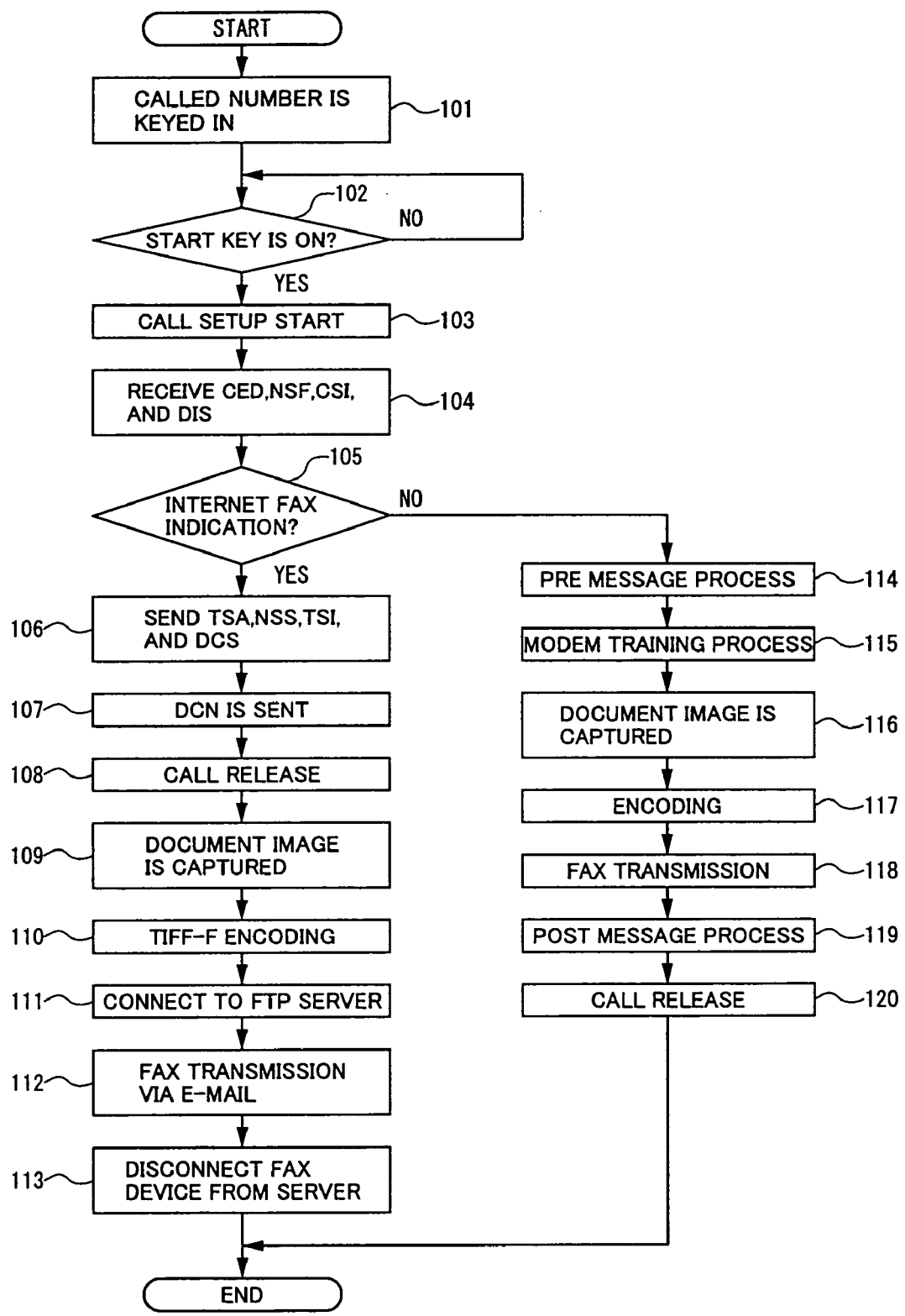
FIG. 7 is a flowchart for explaining a transmission control procedure of the communication control method of the present embodiment performed at a calling network fax device.

FIG. 7 is a flowchart for explaining a transmission control procedure of the communication control method of the present embodiment performed at a calling network fax device "FX". In the following description, the calling network fax device "FX" is referred to as the calling fax device, for the sake of simplicity.

At a start of the transmission control procedure, the user on the calling fax device selects the PSTN and places the document (which contains a document image to be transmitted) on the scanner 5. As shown in FIG. 7, the called number is keyed in the calling fax device (step 101). The calling fax device determines whether a start key (not shown) of the control panel 7 is depressed by the user (step 102). The calling fax device is set in a waiting condition until the start key is depressed.

When the start key is depressed, the calling fax device starts performing a call setup process with the called number (step 103). The calling fax device receives the CED signal, the NSF signal, the CSI signal and the DIS signal from the called fax device (step 104).

After the step 104 is performed, the calling fax device determines whether the Internet fax indication is contained in the received NSF signal (step 105).

When the result at the step 105 is affirmative, the calling fax device recognizes that the called fax device has the Internet fax capability. The calling fax device sequentially sends the NSS signal, the TSA signal, the TSI signal, and the DCS signal to the called fax device (step 106).

After the step 106 is performed, the calling fax device sends the DCN signal to the called fax device (step 107). Then, the call setup process is terminated and the call is released from the PSTN (step 108).

After the step 108 is performed, the calling fax device captures the document image by optically scanning the document on the scanner 5 (step 109). The calling fax device attaches the fax image to the e-mail header and encodes the same in the TIFF-F compressed data format (step 110).

After the step 110 is performed, the calling fax device connects to the FTP server corresponding to the URL (step 111). The calling fax device performs the FTP-based fax transmission via e-mail to the FTP server (step 112). After the step 112 is performed, the calling fax device is disconnected from the FTP server (step 113). The transmission control procedure for the present case is terminated.

On the other hand, when the result at the step 105 is negative, the calling fax device recognizes that the called fax device has no Internet fax capability. The calling fax device determines to perform the PSTN-based fax transmission process conforming to ITU-T recommendation T.30. The calling fax device performs the pre message process (step 114).

After the step 114 is performed, the calling fax device performs a modem training process to determine the modem transmission speed and mode (step 115).

After the step 115 is performed, the calling fax device captures the document image by optically scanning the document on the scanner 5 (step 116). The calling fax device encodes the fax image by using the codec 8 (step 117).

After the step 117 is performed, the calling fax device performs the PSTN-based fax transmission to the called fax device (step 118). After the step 118 is performed, the calling fax device performs the post message process (step 119). The calling fax device releases the call from the PSTN (step 120). The transmission control procedure for the present case is terminated.

Figure 8:
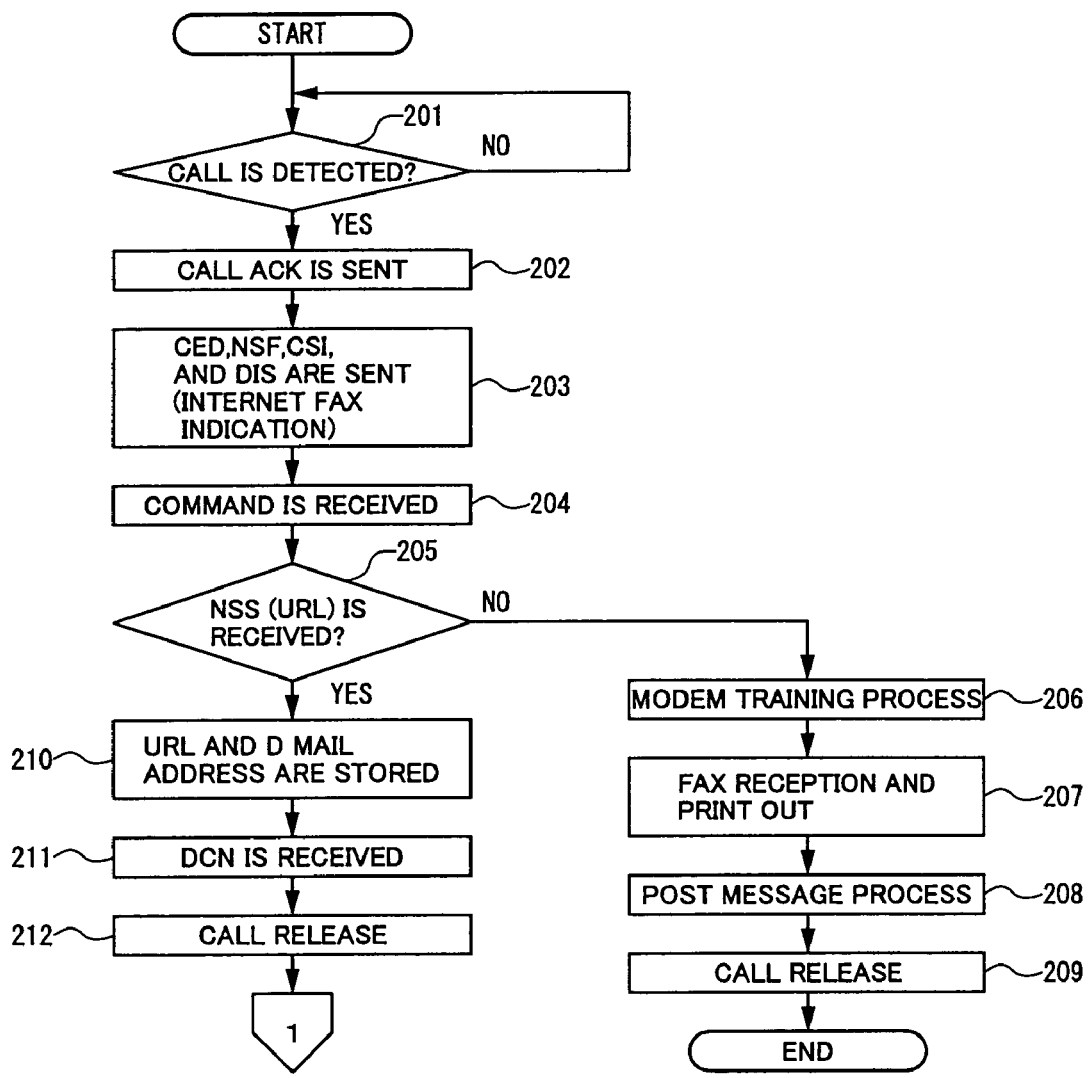
FIG. 8 and FIG. 9 are a flowchart for explaining a reception control procedure of the communication control method of the present embodiment performed at a called network fax device.
Figure 9:
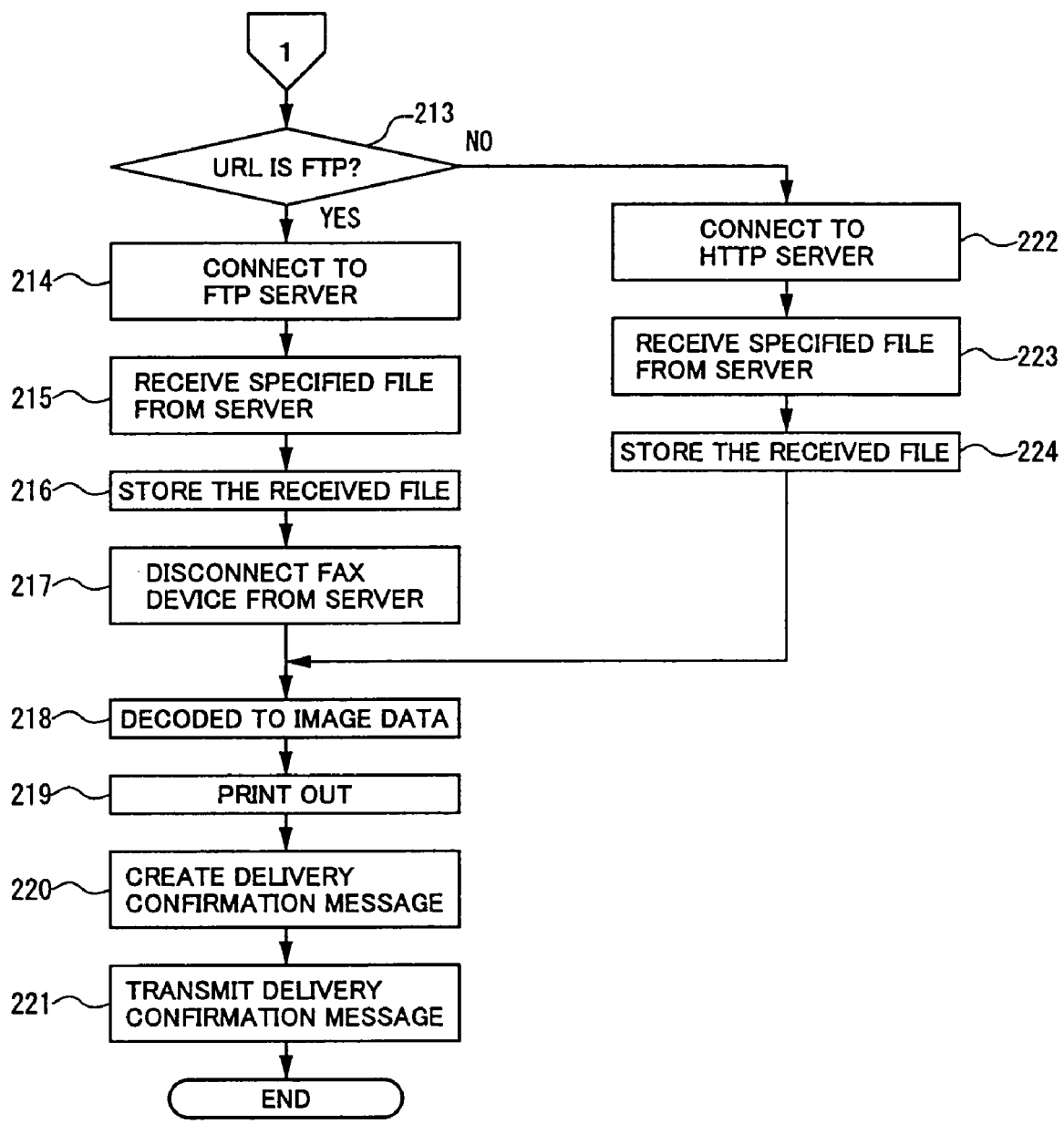

FIG. 8 and FIG. 9 are a flowchart for explaining a reception control procedure of the communication control method of the present embodiment performed at a called network fax device "FX". In the following description, the called network fax device "FX" is referred to as the called fax device, for the sake of simplicity.

As shown in FIG. 8, at a start of the reception control procedure, the called fax device determines whether a call from the PSTN is detected (step 201). The called fax device is set in a waiting condition until the call from the PSTN is detected.

When the call from the PSTN is detected, the called fax device sends a call acknowledgement to the calling fax device (step 202). After the step 202 is performed, the called fax device sequentially sends the CED signal, the NSF signal, the CSI signal, and the DIS signal to the calling fax device (step 203). As has been described above, when the called fax device has an Internet fax capability, the NSF signal carrying the Internet fax indication is sent by the called fax device.

After the step 203 is performed, the called fax device receives a command, such as the NSS signal, from the calling fax device (step 204). The called fax device determines whether the URL is contained in the received NSS signal (step 205).

When the result at the step 205 is negative, the called fax device performs the modem training process to determine the modem reception speed and mode (step 206). The called fax device performs the PSTN-based fax reception process to receive the fax image and print out the received fax image by using the plotter 6 (step 207). After the step 207 is performed, the called fax device performs the post message process (step 208). The called fax device releases the call from the PSTN (step 209). The reception control procedure for the present case is terminated.

On the other hand, when the result at the step 205 is affirmative, the called fax device stores the URL contained in the NSS signal, and the destination mail address contained in the TSA signal (step 210). The called fax device receives the DCN signal from the calling fax device (step 211). The called fax device releases the call from the PSTN (step 212).

As shown in FIG. 9, after the step 212 is performed, the called fax device determines whether the received URL is described in the FTP format (step 213).

When the result at the step 213 is affirmative, the received URL is described in the FTP format. The called fax device connects to the FTP server corresponding to the URL (step 214). The called fax device receives the fax image file, specified by the URL, from the FTP server (step 215). The called fax device stores the received file (step 216). After the step 216 is performed, the called fax device is disconnected from the FTP server (step 217).

After the called fax device is disconnected from the FTP server, the called fax device decodes the stored file into the reconstructed image data (step 218). The called fax device prints out the image data by using the plotter 6 (step 219).

After the step 219 is performed, the called fax device creates a delivery-confirmation message (step 220). The called fax device transmits the delivery-confirmation message to the destination whose location is indicated by the received destination mail address (step 221). After the step 221 is performed, the reception control procedure for the present case is terminated.

When the result at the step 213 is negative, it is determined that the received URL is described in the HTTP format. The called fax device connects to the HTTP server corresponding to the URL (step 222). The called fax device receives the fax image file, specified by the URL, from the HTTP server (step 223). The called fax device stores the received file (step 224). After the step 224 is performed, the called fax device performs the above steps 218 through 221. After the step 221 is performed, the reception control procedure for the present case is terminated.

The communication control method of the above-described embodiment is effective in reducing the cost of fax communications of the Internet fax devices since the fax transmissions and receptions are automatically performed between the Internet fax devices via the Internet, rather than via the PSTN, when a call to the PSTN is initiated by one of the Internet fax devices.

As the user or the administrator on the destination workstation or fax device receives the delivery-confirmation message from the called Internet fax device, the delivery of the fax image to the called Internet fax device can be checked by the user or the administrator, which provides increased operability and reliability for the maintenance of fax communications of the Internet fax devices.

Figure 10:
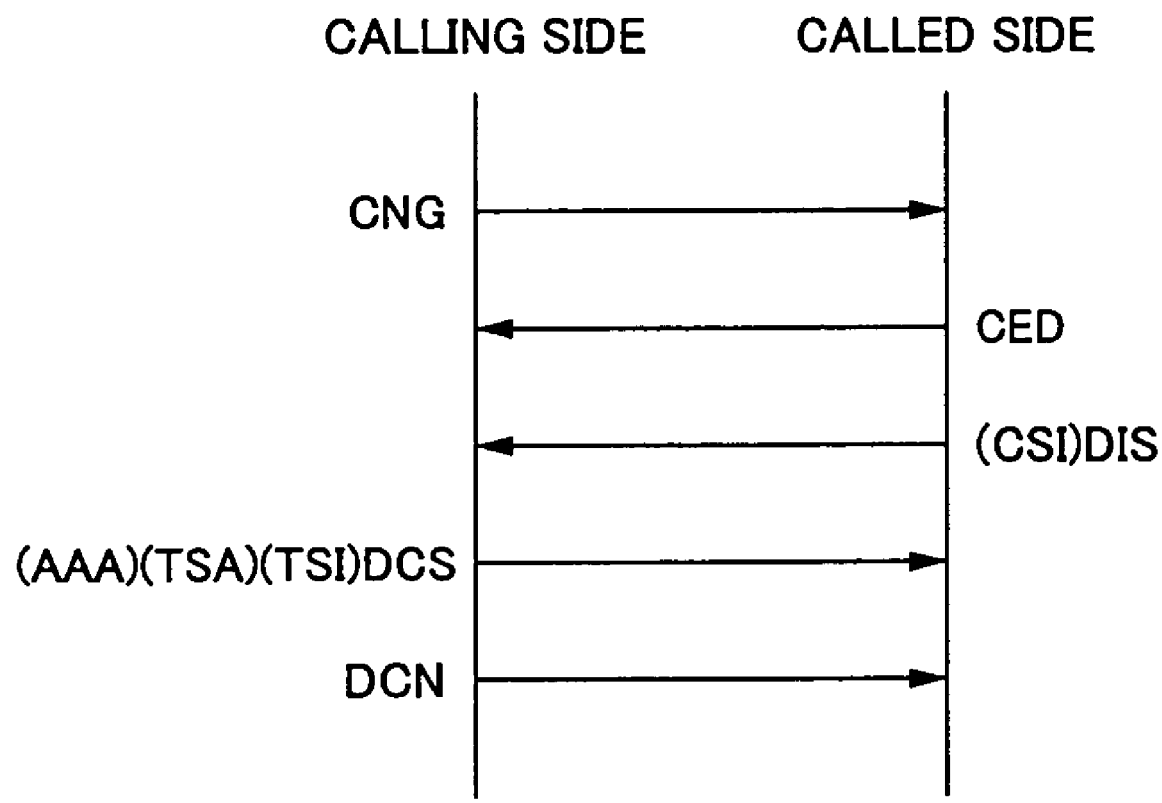
FIG. 10 is a diagram for explaining communication control steps of another preferred embodiment of the communication control method of the invention prior to a start of fax transmission.

Next, FIG. 10 shows communication control steps of another preferred embodiment of the communication control method of the invention prior to a start of fax transmission.

Unlike the previous embodiment of FIG. 6, in the present embodiment, the Internet fax indication is carried on the DIS signal that conforms to ITU-T recommendation T.30, and the DIS signal is sent from the called Internet fax device to the calling Internet fax device. The URL is carried on a standard protocol signal (which is labeled, for example, "AAA") that conforms to ITU-T recommendation T.30, and the standard protocol signal AAA is sent from the calling Internet fax device to the called Internet fax device. Similar to the previous embodiment of FIG. 6, in the present embodiment, the destination mail address is carried on the TSA signal that conforms to ITU-T recommendation T.30, and the TSA signal is sent from the calling Internet fax device to the called Internet fax device.

In the embodiment of FIG. 10, suppose that a call to the PTSN is initiated by a calling Internet fax device, and the called number, keyed in the calling Internet fax device, indicates a fax number of another Internet fax device on the PSTN.

The call from the calling Internet fax device is sent from the PSTN to the called Internet fax device. In response to this, a call acknowledgement is sent from the called Internet fax device to the calling Internet fax device. At this instant, as shown in FIG. 10, the calling Internet fax device sends a CNG signal to the called Internet fax device. In response to the CNG signal, the called Internet fax device sends a CED signal to the calling Internet fax device.

After the CED signal is transmitted, the called Internet fax device sequentially sends the CSI signal and the DIS signal to the calling Internet fax device. The CSI signal indicates a called subscriber identification of the called Internet fax device, and this information is provided to the calling Internet fax device with the CSI signal. The DIS signal indicates standard facilities of the called Internet fax device, and this information is provided to the calling Internet fax device with the DIS signal.

As described above, in the present embodiment, the Internet fax indication is carried on the DIS signal, and this DIS signal is sent from the called Internet fax device to the calling Internet fax device.

When the DIS signal is received at the calling Internet fax device, the calling Internet fax device determines whether the Internet fax indication is contained in the received DIS signal. In the present example of FIG. 10, the received DIS signal contains the Internet fax indication, and the calling Internet fax device recognizes that the called fax device has the Internet fax capability.

In the example of FIG. 10, after the Internet fax indication is received, the calling Internet fax device determines to perform the fax transmission to the called Internet fax device over the Internet by using the FTP or the HTTP, rather than through the PSTN. The calling Internet fax device sequentially sends the AAA signal, the TSA signal, the TSI signal, and the DCS signal to the called Internet fax device. The URL, which indicates a location of a destination of the sending fax image on the Internet, is carried on the AAA signal, and the URL is sent to the called Internet fax device with the AAA signal. The TSA signal carries the destination mail address which indicates a location of a destination of a delivery-confirmation message, and the destination mail address is sent to the called Internet fax device with the TSA signal. The TSI signal carries a transmitting subscriber information item of the calling Internet fax device, and this information item is sent to the called Internet fax device with the TSI signal. The DCS signal indicates a standard facilities setup of the calling Internet fax device, and this information is provided to the called Internet fax device with the DCS signal.

After these signals are sent to the called Internet fax device, the calling Internet fax device sends a DCN signal to the called Internet fax device, so that the call setup process is terminated and the call is released from the PSTN.

When the AAA signal is received at the called Internet fax device, the URL, carried on the AAA signal, is stored in the called Internet fax device. When the TSA signal is received at the called Internet fax device, the destination mail address, carried on the TSA signal, is stored in the called Internet fax device. When the DCN signal is received at the called Internet fax device, the called Internet fax device releases the call from the PSTN and terminates the call setup process.

After the URL and the destination mail address are sent to the called Internet fax device, the calling Internet fax device attaches the fax image to the e-mail header and encodes the same in the TIFF-F compressed data format. The calling Internet fax device transmits the fax image to the FTP server corresponding to the URL by using the FTP.

On the other hand, the called Internet fax device accesses the FTP server by using the received URL, so that the called Internet fax device receives the fax image from the server by using the FTP or the HTTP. The plotter 6 of the network facsimile device "FX" prints out the received fax image. After the fax image is received, the called Internet fax device creates the delivery-confirmation message and sends the same to the destination whose location is indicated by the received destination mail address.

As the user or the administrator on the destination workstation or fax device receives the delivery-confirmation message from the called Internet fax device, the delivery of the fax image to the called Internet fax device can be checked by the user or the administrator, which provides increased operability and reliability for the maintenance of fax communications of the Internet fax devices.

In the present embodiment, when the received DIS signal contains no Internet fax indication, the calling Internet fax device recognizes that the called fax device has no Internet fax capability. In this case, the calling Internet fax device determines to perform the PSTN-based fax transmission process which conforms to ITU-T recommendation T.30.

Figure 11:
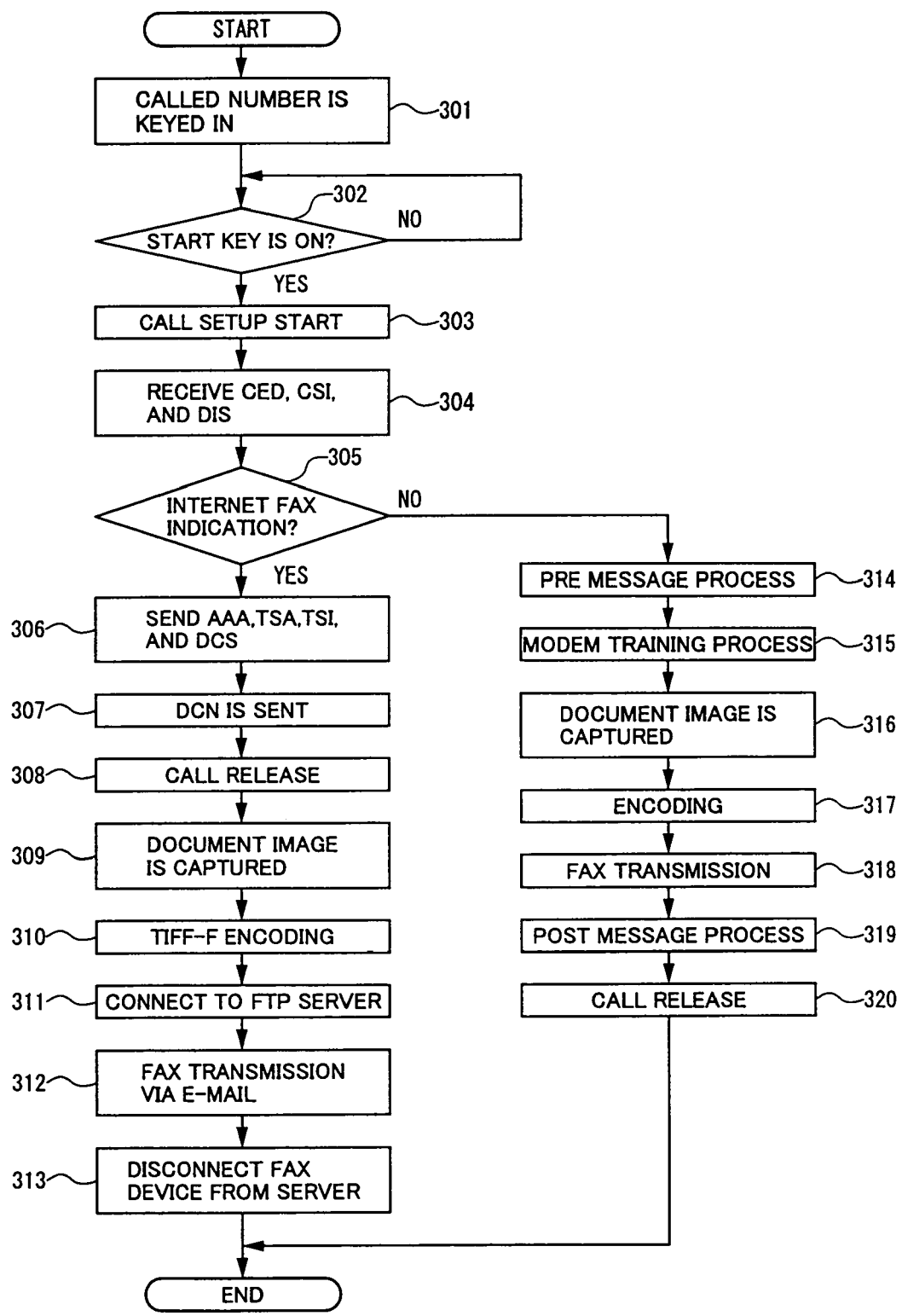
FIG. 11 is a flowchart for explaining a transmission control procedure of the communication control method of the present embodiment performed at a calling network fax device.

FIG. 11 shows a transmission control procedure of the communication control method of the present embodiment performed at a calling network fax device "FX". In the following description, the calling network fax device "FX" is referred to as the calling fax device, for the sake of simplicity.

At a start of the transmission control procedure, the user on the calling fax device selects the PSTN and places the document (which contains a document image to be transmitted) on the scanner 5. As shown in FIG. 11, the called number is keyed in the calling fax device (step 301). The calling fax device determines whether a start key (not shown) of the control panel 7 is depressed by the user (step 302). The calling fax device is set in a waiting condition until the start key is depressed.

When the start key is depressed, the calling fax device starts performing a call setup process with the called number (step 303). The calling fax device receives the CED signal, the CSI signal, and the DIS signal from the called fax device (step 304).

After the step 304 is performed, the calling fax device determines whether the Internet fax indication is contained in the received DIS signal (step 305).

When the result at the step 305 is affirmative, the calling fax device recognizes that the called fax device has the Internet fax capability. The calling fax device sequentially sends the AAA signal, the TSA signal, the TSI signal, and the DCS signal to the called fax device (step 306).

After the step 306 is performed, the calling fax device sends the DCN signal to the called fax device (step 307). Then, the call setup process is terminated and the call is released from the PSTN (step 308).

After the step 308 is performed, the calling fax device captures the document image by optically scanning the document on the scanner 5 (step 309). The calling fax device attaches the fax image to the e-mail header and encodes the same in the TIFF-F compressed data format (step 310).

After the step 310 is performed, the calling fax device connects to the FTP server corresponding to the URL (step 311). The calling fax device performs the FTP-based fax transmission via e-mail to the FTP server (step 312). After the step 312 is performed, the calling fax device is disconnected from the FTP server (step 313). The transmission control procedure for the present case is terminated.

On the other hand, when the result at the step 305 is negative, the calling fax device recognizes that the called fax device has no Internet fax capability. The calling fax device determines to perform the PSTN-based fax transmission process conforming to ITU-T recommendation T.30. The calling fax device performs the pre message process (step 314).

After the step 314 is performed, the calling fax device performs a modem training process to determine the modem transmission speed and mode (step 315).

After the step 315 is performed, the calling fax device captures the document image by optically scanning the document on the scanner 5 (step 316). The calling fax device encodes the fax image by using the codec 8 (step 317).

After the step 317 is performed, the calling fax device performs the PSTN-based fax transmission to the called fax device (step 318). After the step 318 is performed, the calling fax device performs the post message process (step 319). The calling fax device releases the call from the PSTN (step 320). The transmission control procedure for the present case is terminated.

Figure 12:
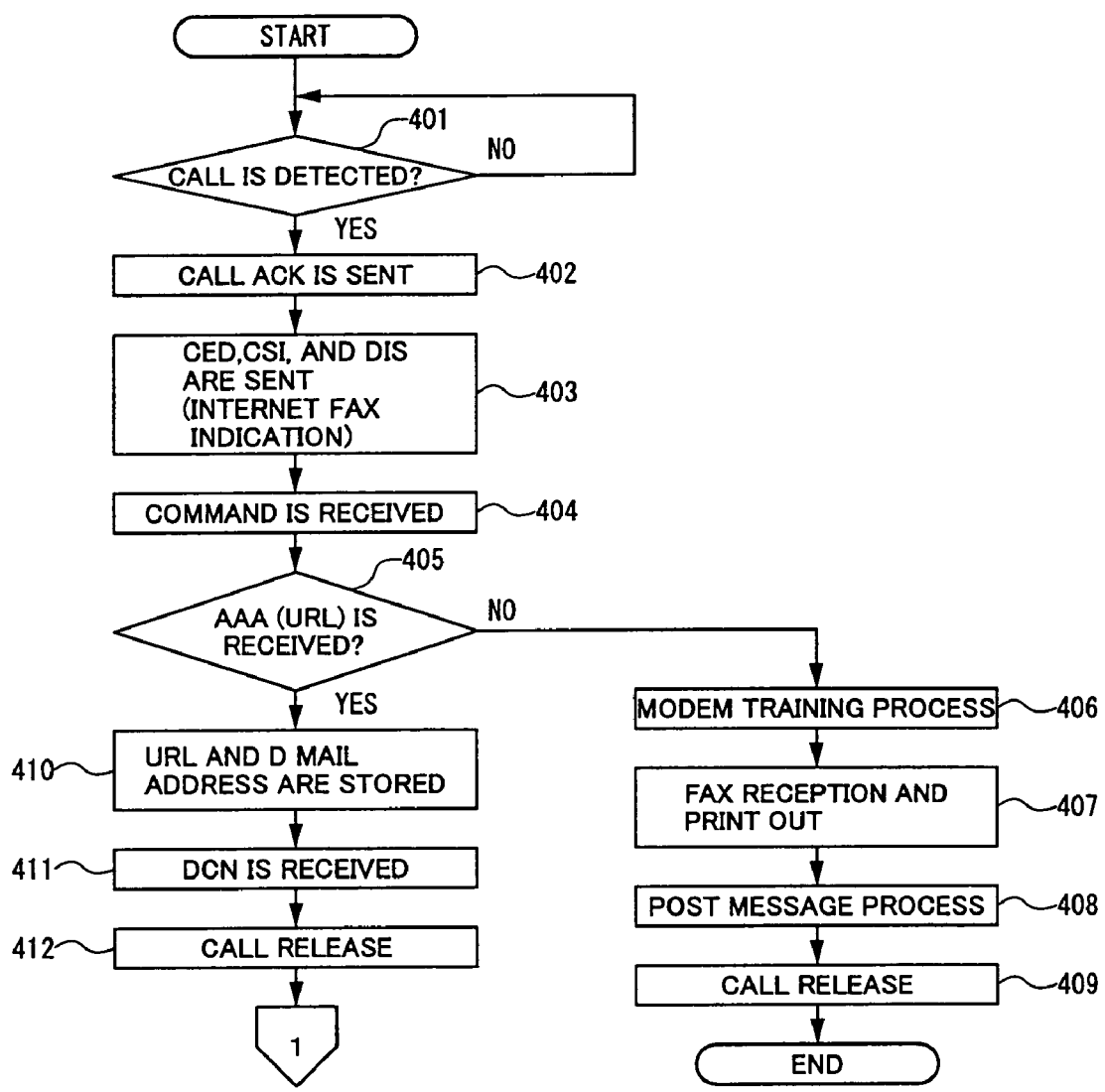
FIG. 12 and FIG. 13 are a flowchart for explaining a reception control procedure of the communication control method of the present embodiment performed at a called network fax device.
Figure 13:
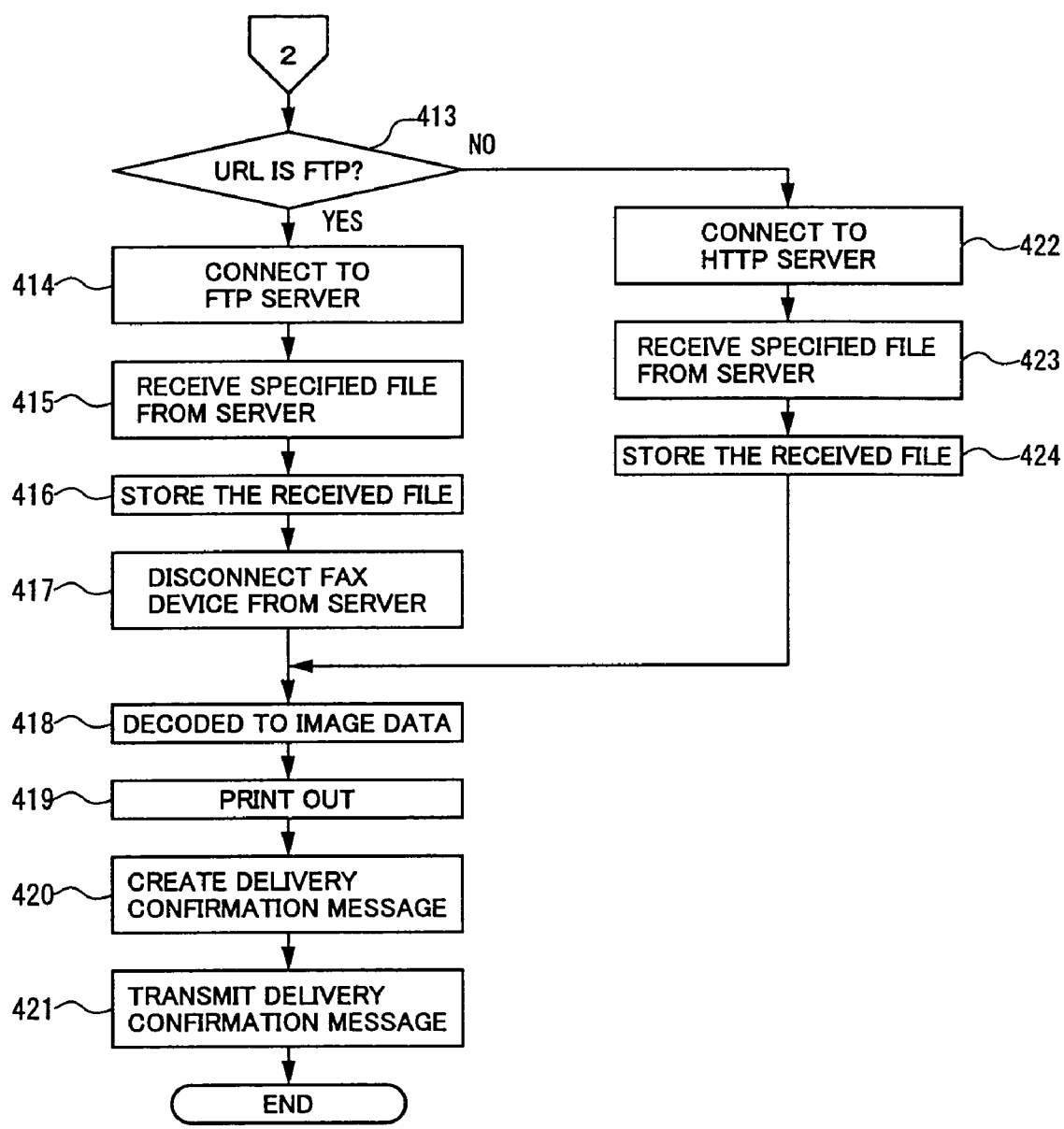

FIG. 12 and FIG. 13 show a reception control procedure of the communication control method of the present embodiment performed at a called network fax device "FX". In the following description, the called network fax device "FX" is referred to as the called fax device, for the sake of simplicity.

As shown in FIG. 12, at a start of the reception control procedure, the called fax device determines whether a call from the PSTN is detected (step 401). The called fax device is set in a waiting condition until the call from the PSTN is detected.

When the call from the PSTN is detected, the called fax device sends a call acknowledgement to the calling fax device (step 402). After the step 402 is performed, the called fax device sequentially sends the CED signal, the CSI signal, and the DIS signal to the calling fax device (step 403). As has been described above, when the called fax device has an Internet fax capability, the DIS signal carrying the Internet fax indication is sent by the called fax device.

After the step 403 is performed, the called fax device receives a command, such as the AAA signal, from the calling fax device (step 404). The called fax device determines whether the URL is contained in the received AAA signal (step 405).

When the result at the step 405 is negative, the called fax device performs the modem training process to determine the modem reception speed and mode (step 406). The called fax device performs the PSTN-based fax reception process to receive the fax image and print out the received fax image by using the plotter 6 (step 407). After the step 407 is performed, the called fax device performs the post message process (step 408). The called fax device releases the call from the PSTN (step 409). The reception control procedure for the present case is terminated.

On the other hand, when the result at the step 405 is affirmative, the called fax device stores the URL contained in the AAA signal, and the destination mail address contained in the TSA signal (step 410). The called fax device receives the DCN signal from the calling fax device (step 411). The called fax device releases the call from the PSTN (step 412).

As shown in FIG. 13, after the step 412 is performed, the called fax device determines whether the received URL is described in the FTP format (step 413).

When the result at the step 413 is affirmative, the received URL is described in the FTP format. The called fax device connects to the FTP server corresponding to the URL (step 414). The called fax device receives the fax image file, specified by the URL, from the FTP server (step 415). The called fax device stores the received file (step 416). After the step 416 is performed, the called fax device is disconnected from the FTP server (step 417).

After the called fax device is disconnected from the FTP server, the called fax device decodes the stored file into the reconstructed image data (step 418). The called fax device prints out the image data by using the plotter 6 (step 419).

After the step 419 is performed, the called fax device creates a delivery-confirmation message (step 420). The called fax device transmits the delivery-confirmation message to the destination whose location is indicated by the received destination mail address (step 421). After the step 421 is performed, the reception control procedure for the present case is terminated.

When the result at the step 413 is negative, it is determined that the received URL is described in the HTTP format. The called fax device connects to the HTTP server corresponding to the URL (step 422). The called fax device receives the fax image file, specified by the URL, from the HTTP server (step 423). The called fax device stores the received file (step 424). After the step 424 is performed, the called fax device performs the above steps 418 through 421. After the step 421 is performed, the reception control procedure for the present case is terminated.

The communication control method of the above-described embodiment is effective in reducing the cost of fax communications of the Internet fax devices since the fax transmissions and receptions are automatically performed between the Internet fax devices via the Internet, rather than via the PSTN, when a call to the PSTN is initiated by one of the Internet fax devices.

As the user or the administrator on the destination workstation or fax device receives the delivery-confirmation message from the called Internet fax device, the delivery of the fax image to the called Internet fax device can be checked by the user or the administrator, which provides increased operability and reliability for the maintenance of fax communications of the Internet fax devices.

Figure 14:
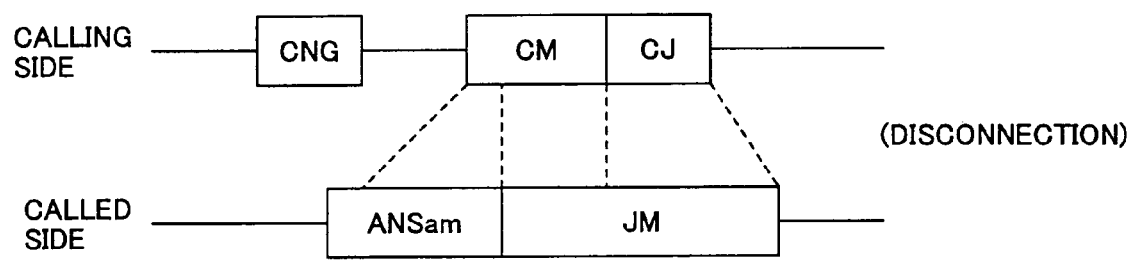
FIG. 14 is a diagram for explaining communication control steps of another preferred embodiment of the communication control method of the invention prior to a start of fax transmission.

Next, FIG. 14 shows communication control steps of another preferred embodiment of the communication control method of the invention prior to a start of fax transmission.

As described in ITU-T standard V.34, V.34 modems perform, prior to a start of fax transmission, the preparatory modem process, which conforms to ITU-T recommendation V.8, in order to determine the modem features and options. As shown in FIG. 14, during the preparatory modem process, protocol signals CM and CJ are sent from the calling device to the called device, and a protocol signal JM is sent from the called device to the calling device. The protocol signal CM and the protocol signal JM include a non-standard field that can be utilized by the user in a desired manner.

Unlike the previous embodiments of FIG. 6 and FIG. 10, in the present embodiment, the Internet fax indication is sent from the called Internet fax device to the calling Internet fax device by using the non-standard field of the protocol signal JM that conforms to ITU-T recommendation V.8. The URL and the destination mail address are sent from the calling Internet fax device to the called Internet fax device by using the non-standard field of the protocol signal CM that conforms to ITU-T recommendation V.8.

Figure 15:
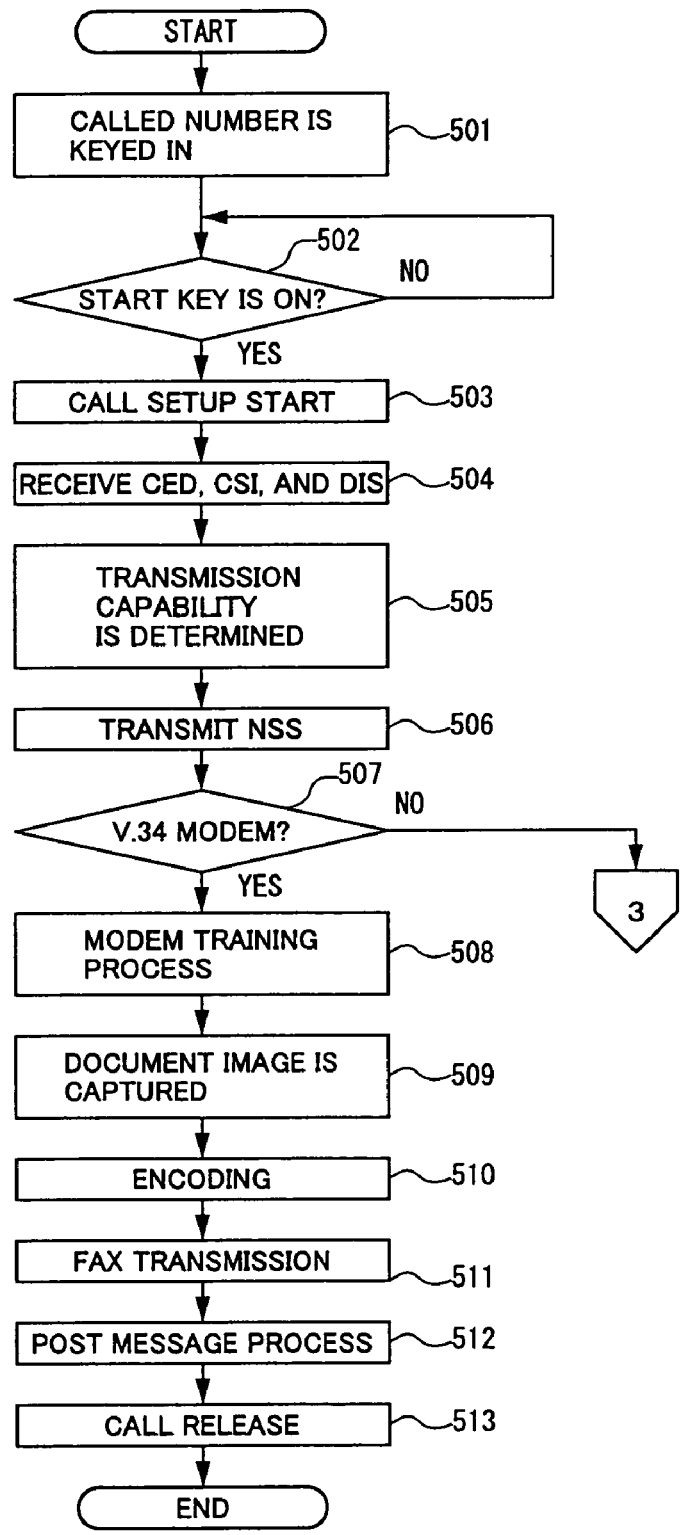
FIG. 15 and FIG. 16 are a flowchart for explaining a transmission control procedure of the communication control method of the present embodiment performed at a calling network fax device.
Figure 16:
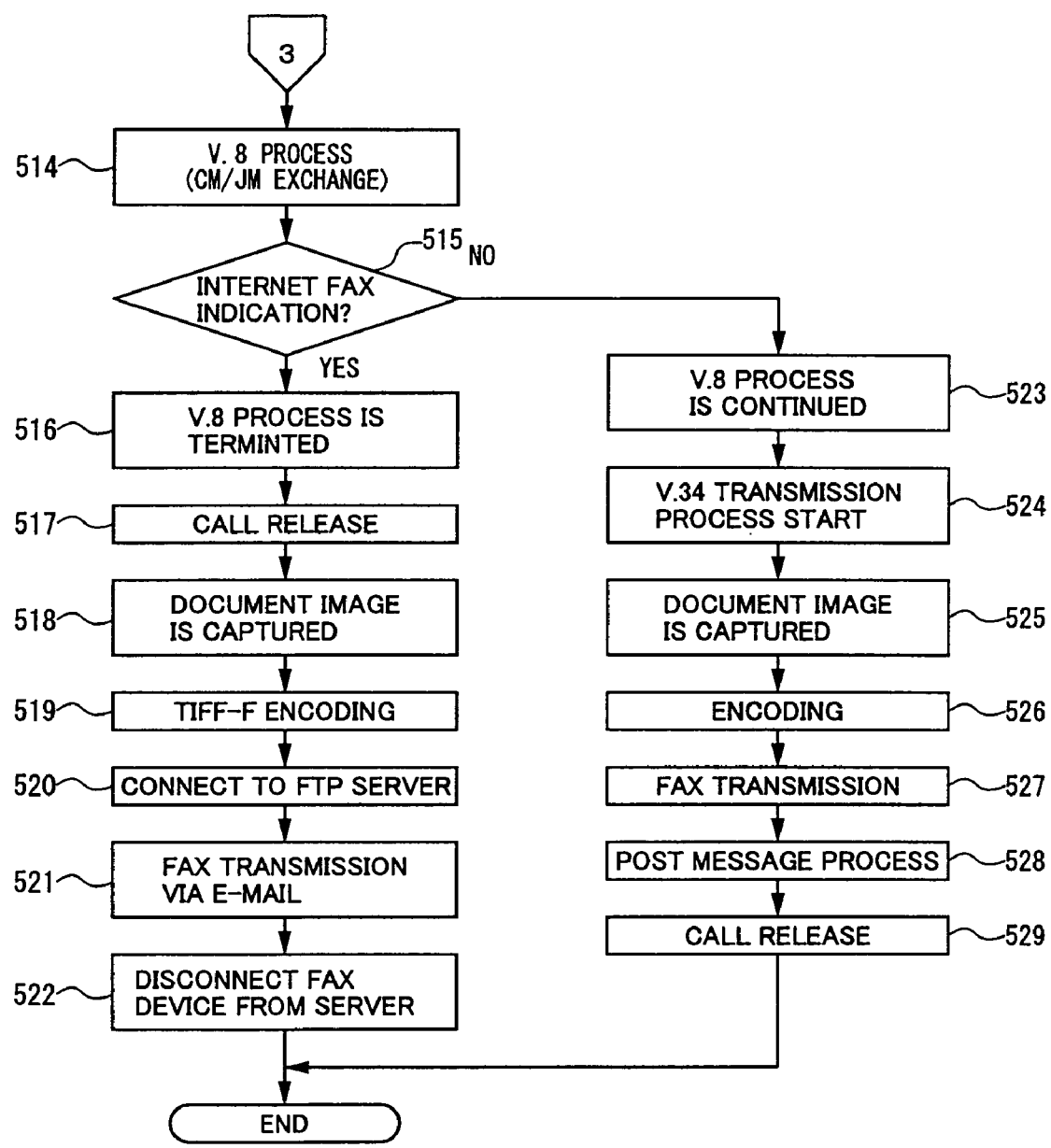

FIG. 15 and FIG. 16 show a transmission control procedure of the communication control method of the present embodiment performed at a calling network fax device. In the following description, the calling network fax device "FX" is referred to as the calling fax device, for the sake of simplicity.

At a start of the transmission control procedure, the user on the calling fax device selects the PSTN and places the document (which contains a document image to be transmitted) on the scanner 5. As shown in FIG. 15, the called number is keyed in the calling fax device (step 501). The calling fax device determines whether a start key (not shown) of the control panel 7 is depressed by the user (step 502). The calling fax device is set in a waiting condition until the start key is depressed.

When the start key is depressed, the calling fax device starts performing a call setup process with the called number (step 503). The calling fax device receives the CED signal, the CSI signal, and the DIS signal from the called fax device (step 504).

After the step 504 is performed, the calling fax device determines the transmission capability used (step 505). The calling fax device sends the NSS signal to the called fax device, the NSS signal indicating the determined transmission capability (step 506).

After the step 506 is performed, the calling fax device determines whether the V.34 modem capability is selected (step 507). When the result at the step 507 is negative, the calling fax device determines to perform the PSTN-based fax transmission process conforming to ITU-T recommendation T.30. The calling fax device performs a modem training process to determine the modem transmission speed and mode (step 508).

After the step 508 is performed, the calling fax device captures the document image by optically scanning the document on the scanner 5 (step 509). The calling fax device encodes the fax image by using the codec 8 (step 510).

After the step 510 is performed, the calling fax device performs the PSTN-based fax transmission to the called fax device (step 511). After the step 511 is performed, the calling fax device performs the post message process (step 512). The calling fax device releases the call from the PSTN (step 513). The transmission control procedure for the present case is terminated.

As shown in FIG. 16, when the result at the step 507 is affirmative, the calling fax device determines to perform the V.8 preparatory modem process. The calling fax device receives the protocol signal JM from the called fax device during the preparatory modem process (step 514).

After the step 514 is performed, the calling fax device determines whether the Internet fax indication is contained in the non-standard field of the received protocol signal JM (step 515).

When the result at the step 515 is affirmative, the calling fax device recognizes that the called fax device has the Internet fax capability. The calling fax device terminates the preparatory modem process (step 516). The calling fax device releases the call from the PSTN (step 517).

After the step 517 is performed, the calling fax device captures the document image by optically scanning the document on the scanner 5 (step 518). The calling fax device attaches the fax image to the e-mail header and encodes the same in the TIFF-F compressed data format (step 519).

After the step 519 is performed, the calling fax device connects to the FTP server corresponding to the URL (step 520). The calling fax device performs the FTP-based fax transmission via e-mail to the FTP server (step 521). After the step 521 is performed, the calling fax device is disconnected from the FTP server (step 522). The transmission control procedure for the present case is terminated.

On the other hand, when the result at the step 515 is negative, the calling fax device recognizes that the called fax device has no Internet fax capability. The calling fax device determines to perform the PSTN-based fax transmission process conforming to ITU-T recommendation V.34. The calling fax device continues to perform the V.8 preparatory modem process (step 523). The calling fax device starts performing the V.34 modem transmission process (step 524).

After the step 524 is performed, the calling fax device captures the document image by optically scanning the document on the scanner 5 (step 525). The calling fax device encodes the fax image by using the codec 8 (step 526).

After the step 526 is performed, the calling fax device performs the PSTN-based fax transmission to the called fax device (step 527). After the step 527 is performed, the calling fax device performs the post message process (step 528). The calling fax device releases the call from the PSTN (step 529). The transmission control procedure for the present case is terminated.

Figure 17:
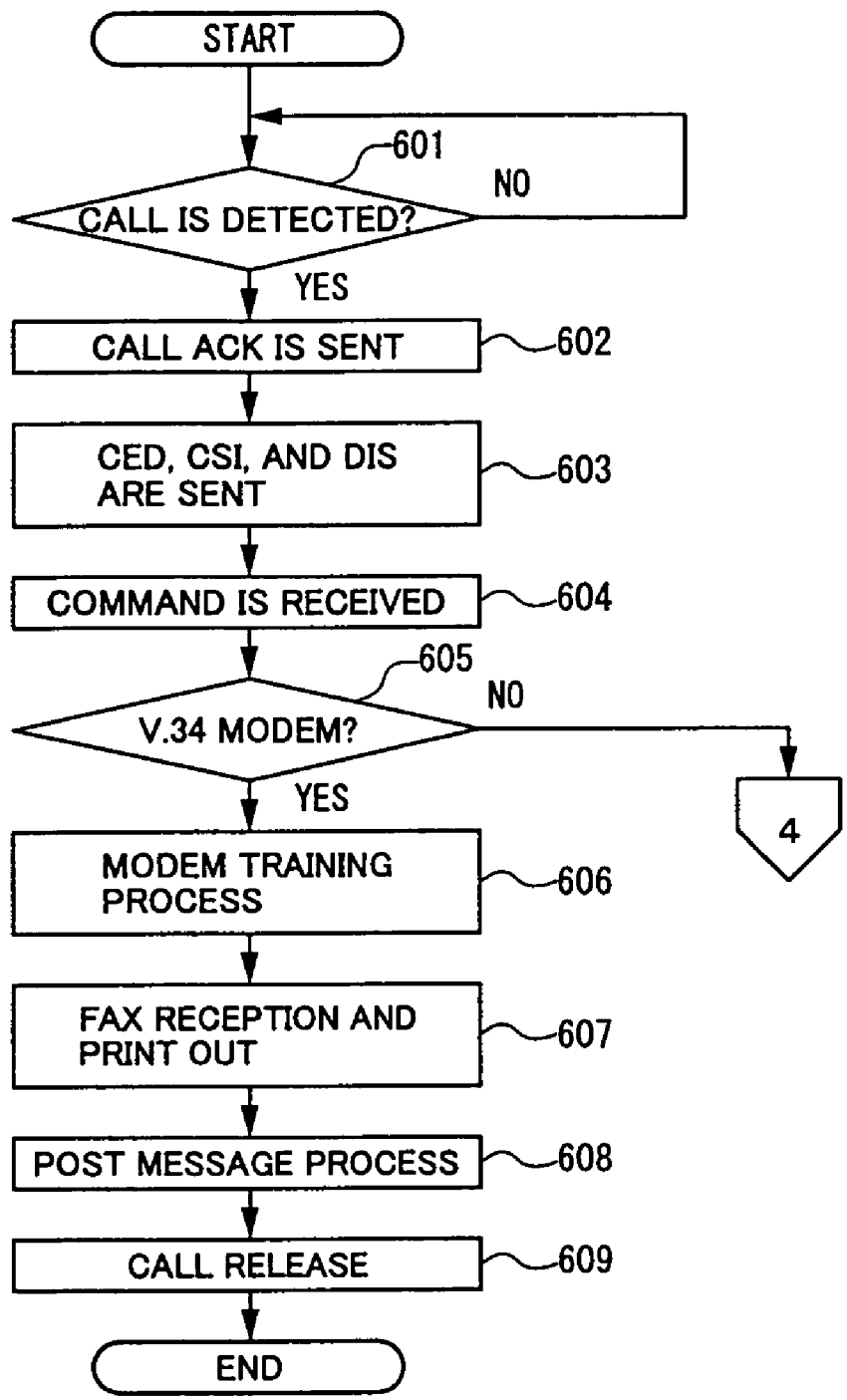
FIG. 17 and FIG. 18 are a flowchart for explaining a reception control procedure of the communication control method of the present embodiment performed at a called network fax device.
Figure 18:
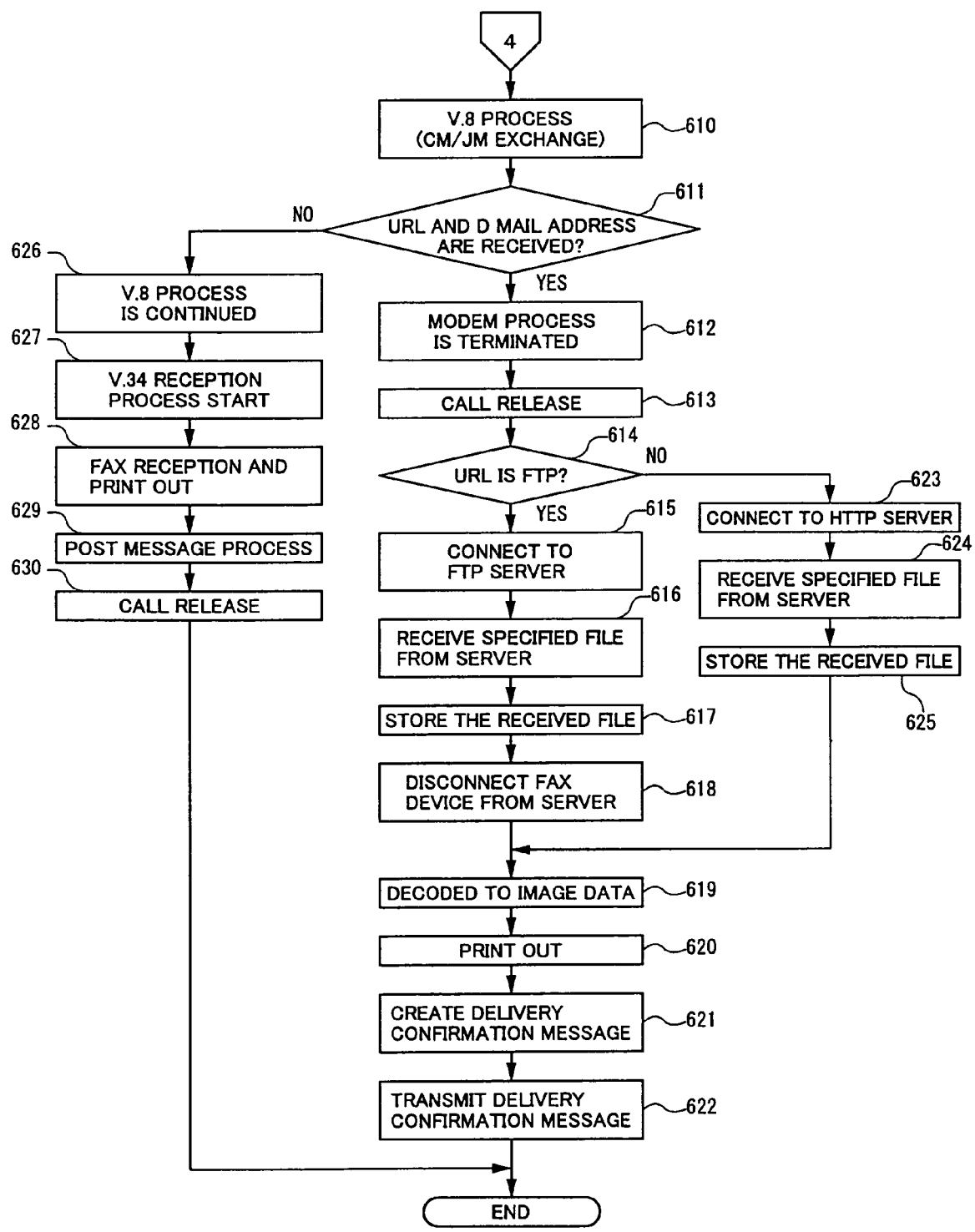

FIG. 17 and FIG. 18 show a reception control procedure of the communication control method of the present embodiment performed at a called network fax device "FX". In the following description, the called network fax device "FX" is referred to as the called fax device, for the sake of simplicity.

As shown in FIG. 17, at a start of the reception control procedure, the called fax device determines whether a call from the PSTN is detected (step 601). The called fax device is set in a waiting condition until the call from the PSTN is detected. When the call from the PSTN is detected, the called fax device sends a call acknowledgement to the calling fax device (step 602). After the step 602 is performed, the called fax device sequentially sends the CED signal, the CSI signal, and the DIS signal to the calling fax device (step 603). After the step 603 is performed, the called fax device receives a command from the calling fax device (step 604). The called fax device determines whether the V.34 modem capability is selected in the received command (step 605).

When the result at the step 605 is negative, the called fax device performs the modem training process to determine the modem reception speed and mode (step 606). The called fax device performs the PSTN-based fax reception process to receive the fax image and print out the received fax image by using the plotter 6 (step 607). After the step 607 is performed, the called fax device performs the post message process (step 608). The called fax device releases the call from the PSTN (step 609). The reception control procedure for the present case is terminated.

As shown in FIG. 18, when the result at the step 605 is affirmative, the called fax device determines to perform the V.8 preparatory modem process. The called fax device receives the protocol signal CM from the calling fax device during the preparatory modem process (step 610).

After the step 610 is performed, the called fax device determines whether the URL and the destination mail address are contained in the non-standard field of the received protocol signal CM (step 611).

When the result at the step 611 is negative, the called fax device continues the V.8 preparatory modem process (step 626). The called fax device starts performing the V.34 modem reception process (step 627). The called fax device performs the PSTN-based fax reception process to receive the fax image and print out the received fax image by using the plotter 6 (step 628). After the step 628 is performed, the called fax device performs the post message process (step 629). The called fax device releases the call from the PSTN (step 630). The reception control procedure for the present case is terminated.

On the other hand, when the result at the step 611 is affirmative, the called fax device terminates the V.8 preparatory modem process (step 612). The called fax device releases the call from the PSTN (step 613).

After the step 613 is performed, the called fax device determines whether the received URL is described in the FTP format (step 614).

When the result at the step 614 is affirmative, the received URL is described in the FTP format. The called fax device connects to the FTP server corresponding to the URL (step 615). The called fax device receives the fax image file, specified by the URL, from the FTP server (step 616). The called fax device stores the received file (step 617). After the step 617 is performed, the called fax device is disconnected from the FTP server (step 618).

After the called fax device is disconnected from the FTP server, the called fax device decodes the stored file into the reconstructed image data (step 619). The called fax device prints out the image data by using the plotter 6 (step 620).

After the step 620 is performed, the called fax device creates a delivery-confirmation message (step 621). The called fax device transmits the delivery-confirmation message to the destination whose location is indicated by the received destination mail address (step 622). After the step 622 is performed, the reception control procedure for the present case is terminated.

When the result at the step 614 is negative, it is determined that the received URL is described in the HTTP format. The called fax device connects to the HTTP server corresponding to the URL (step 623). The called fax device receives the fax image file, specified by the URL, from the HTTP server (step 624). The called fax device stores the received file (step 625). After the step 625 is performed, the called fax device performs the above steps 619 through 622. After the step 622 is performed, the reception control procedure for the present case is terminated.

The communication control method of the above-described embodiment is effective in reducing the cost of fax communications of the Internet fax devices since the fax transmissions and receptions are automatically performed between the Internet fax devices via the Internet, rather than via the PSTN, when a call to the PSTN is initiated by one of the Internet fax devices.

As the user or the administrator on the destination workstation or fax device receives the delivery-confirmation message from the called Internet fax device, the delivery of the fax image to the called Internet fax device can be checked by the user or the administrator, which provides increased operability and reliability for the maintenance of fax communications of the Internet fax devices.

The present invention is not limited to the above-described embodiments, and variations and modifications may be made without departing from the scope of the present invention. For example, in the above-described embodiments, the FTP or HTTP protocol is used to carry out the fax transmission and reception. Alternatively, other suitable communication protocols may be used instead. Further, the present invention is based on Japanese priority application No. 11-139523, filed on May 20, 1999, the entire contents of which are hereby incorporated by reference.

What is claimed is:

1. A method of controlling a network facsimile communication system including Internet fax devices and a server, the Internet fax devices having both a capability of exchanging fax images over a public switched telephone network PSTN and a capability of exchanging messages over the Internet, the server having a file transfer capability and provided on the Internet, the method comprising the steps of:

causing a called Internet fax device to send, when an incoming call from the PSTN is detected, an Internet fax indication to a calling Internet fax device, the indication indicating that the called device has an Internet fax capability;

causing the calling Internet fax device to send, after the Internet fax indication is received, an universal resource locator URL, indicating a location of the server on the Internet as a destination of a fax image, to the called Internet fax device, to release the call from the PSTN, and to transmit the fax image to the server corresponding to the URL; and causing the called Internet fax device to access the server on the Internet by using the received URL, so that the called Internet fax device receives the fax image from the server.

2. The method according to claim 1, wherein the Internet fax indication is carried on an NSF signal which conforms to ITU-T recommendation T.30, and the NSF signal is sent to the calling Internet fax device by the called Internet fax device.

3. The method according to claim 1, wherein the Internet fax indication is carried on an DIS signal which conforms to ITU-T recommendation T.30, and the DIS signal is sent to the calling Internet fax device by the called Internet fax device.

4. The method according to claim 1, wherein the Internet fax indication is sent to the calling Internet fax device by the called Internet fax device by using a non-standard field of a protocol signal which conforms to ITU-T recommendation V.8.

5. The method according to claim 1, wherein the URL is carried on an NSS signal which conforms to ITU-T recommendation T.30, and the NSS signal is sent to the called Internet fax device by the calling Internet fax device.

6. The method according to claim 1, wherein the URL is carried on a standard protocol signal which conforms to ITU-T recommendation T.30, and the standard protocol signal is sent to the called Internet fax device by the calling Internet fax device.

7. The method according to claim 1, wherein the URL is sent to the called Internet fax device by the calling Internet fax device by using a non-standard field of a protocol signal which conforms to ITU-T recommendation V.8.

8. A method of controlling a network facsimile communication system including Internet fax devices and a server, the Internet fax devices having both a capability of exchanging fax images over a public switched telephone network PSTN and a capability of exchanging messages over the Internet, the server having a file transfer capability and provided on the Internet, the method comprising the steps of:

causing a called Internet fax device to send, when an incoming call from the PSTN is detected, an Internet fax indication to a calling Internet fax device, the indication indicating that the called Internet fax device has an Internet fax capability;

causing the calling Internet fax device to send, after the Internet fax indication is received, an universal resource locator URL, indicating a location of the server on the Internet as a destination of a fax image, and a destination mail address, indicating a location of a destination of a delivery-confirmation message, to the called Internet fax device, to release the call from the PSTN, and to transmit the fax image to the server corresponding to the URL; and causing the called Internet fax device to access the server by using the received URL so that the called Internet fax device receives the fax image from the server, and to send, after the fax image is received, the delivery-confirmation message to the destination with the location indicted by the received destination mail address.

9. The method according to claim 8, wherein the Internet fax indication is carried on an NSF signal which conforms to ITU-T recommendation T.30, and the NSF signal is sent to the calling Internet fax device by the called Internet fax device.

10. The method according to claim 8, wherein the Internet fax indication is carried on an DIS signal which conforms to ITU-T recommendation T.30, and the DIS signal is sent to the calling Internet fax device by the called Internet fax device.

11. The method according to claim 8, wherein the Internet fax indication is sent to the calling Internet fax device by the called Internet fax device by using a non-standard field of a protocol signal which conforms to ITU-T recommendation V.8.

12. The method according to claim 8, wherein the URL and the destination mail address are carried on an NSS signal which conforms to ITU-T recommendation T.30, and the NSS signal is sent to the called Internet fax device by the calling Internet fax device.

13. The method according to claim 8, wherein the URL and the destination mail address are carried on a standard protocol signal which conforms to ITU-T recommendation T.30, and the standard protocol signal is sent to the called Internet fax device by the calling Internet fax device.

14. The method according to claim 8, wherein the URL and the destination mail address are sent to the called Internet fax device by the calling Internet fax device by using a non-standard field of a protocol signal which conforms to ITU-T recommendation V.8.

15. An Internet fax device for use in a network facsimile communication system including Internet fax devices and a server, the Internet fax device having both a capability of exchanging fax images over a public switched telephone network and a capability of exchanging messages over the Internet, the server being provided on the Internet and having a file transfer capability, the Internet fax device comprising:
- a first unit sending, when an incoming call from the telephone network is received, an Internet fax indication to a calling Internet fax device, the Internet fax indication indicating that the called device has an Internet fax capability; and
- a second unit accessing the server on the Internet to receive a fax image from the server by using an universal resource locator URL which is received from the calling Internet fax device, the URL indicating a location of the server on the Internet as a destination of the fax image transmitted by the calling Internet fax device.

16. An Internet fax device for use in a network facsimile communication system including Internet fax devices and a server, the Internet fax device having both a capability of exchanging fax images over a public switched telephone network and a capability of exchanging messages over the Internet, the server being provided-on the Internet and having a file transfer capability, the Internet fax device comprising:
- a first unit sending, when an incoming call from the telephone network is received, an Internet fax indication to a calling Internet fax device, the Internet fax indication indicating that the called device has an Internet fax capability;
- a second unit accessing the server on the Internet to receive a fax image from the server by using an universal resource locator URL which is received from the calling Internet fax device, the URL indicating a location of the server on the Internet as a destination of the fax image transmitted by the calling Internet fax device; and
- a third unit sending, after the fax image is received, a delivery-confirmation message to a destination a location of which is indicated by a destination mail address received from the calling Internet fax device.

17. A method of controlling an Internet fax device in a network facsimile communication system including Internet fax devices and a server, the Internet fax device having both a capability of exchanging fax images over a public switched telephone network and a capability of exchanging messages over the Internet, the server being provided on the Internet and having a file transfer capability, the method comprising the steps of:
- causing the Internet fax device to send, when an incoming call from the telephone network is received, an Internet fax indication to a calling Internet fax device, the Internet fax indication indicating that the called device has an Internet fax capability; and
- causing the Internet fax device to access the server on the Internet to receive a fax image from the server by using an universal resource locator URL which is received from the calling Internet fax device, the URL indicating a location of the server on the Internet as a destination of the fax image transmitted by the calling Internet fax device.

18. A method of controlling an Internet fax device in a network facsimile communication system including Internet fax devices and a server, the Internet fax device having both a capability of exchanging fax images over a public switched telephone network and a capability of exchanging messages over the Internet, the server being provided on the Internet and having a file transfer capability, the method comprising the steps of:
- causing the Internet fax device to send, when an incoming call from the telephone network is received, an Internet fax indication to a calling Internet fax device, the Internet fax indication indicating that the called device has an Internet fax capability;
- causing the Internet fax device to access the server on the Internet to receive a fax image from the server by using an universal resource locator URL which is received from the calling Internet fax device, the URL indicating a location of the server on the Internet as a destination of the fax image transmitted by the calling Internet fax device; and
- causing the Internet fax device to send, after the fax image is received, a delivery-confirmation message to a destination a location of which is indicated by a destination mail address received from the calling Internet fax device.

* * * * *